US008684811B2

(12) United States Patent
Acres

(10) Patent No.: US 8,684,811 B2
(45) Date of Patent: Apr. 1, 2014

(54) GAMING DEVICE HAVING ADVANCE GAME INFORMATION ANALYZER

(75) Inventor: John F. Acres, Las Vegas, NV (US)

(73) Assignee: Patent Investment & Licensing Company, Las Vegas, NV (US)

( * ) Notice: Subject to any disclaimer, the term of this patent is extended or adjusted under 35 U.S.C. 154(b) by 960 days.

(21) Appl. No.: 12/630,767

(22) Filed: Dec. 3, 2009

(65) Prior Publication Data

US 2011/0136561 A1 Jun. 9, 2011

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC ........................................................ 463/16

(58) Field of Classification Search
USPC ................................................ 463/16, 17
See application file for complete search history.

(56) References Cited

U.S. PATENT DOCUMENTS 3,684,290 A 8/1972 Wayne
3,751,040 A 8/1973 Carey
4,240,635 A 12/1980 Brown
4,283,709 A 8/1981 Lucero et al.
4,433,844 A 2/1984 Hooker et al.
4,620,707 A 11/1986 Lippincott
4,652,998 A 3/1987 Koza et al.
4,712,799 A 12/1987 Fraley
4,837,728 A 6/1989 Barrie et al.
4,911,449 A 3/1990 Dickinson et al.
5,024,439 A 6/1991 Okada
5,026,058 A 6/1991 Bromley
5,033,744 A 7/1991 Bridgeman et al.
5,046,736 A 9/1991 Bridgeman et al.

(Continued)

FOREIGN PATENT DOCUMENTS

CA 2 442 442 C 10/1998
EP 0 141 264 A2 5/1985

(Continued)

OTHER PUBLICATIONS

Acres, John, Measuring the Player Experience: What a Squiggly Line Can Tell You, Inside Edge / Slot Manager, Jan./Feb. 2009, pp. 28-29.

(Continued)

*Primary Examiner* — Omkar Deodhar
*Assistant Examiner* — Reginald Renwick
(74) *Attorney, Agent, or Firm* — Marger Johnson & McCollom PC

(57) ABSTRACT

This concept is directed to methods of operating a gaming device to analyze game information that is part of a gaming event having a player interaction in advance of the player interaction to make a determination about the game play. These methods may be used for a variety of gaming devices such as slot machines, video keno devices, video poker machines, electronic table games, internet gaming terminals, etc. In each type of gaming device, these operation methods evaluate future game information during game play to determine one of multiple manners by which the game play will continue. These continuation manners may include changing the speed of game play, determining display characteristics of the game and outcome, providing tips or information to the player about the future game information, automatically initiating a subsequent game, or otherwise altering an aspect of the game play parameters in response to the evaluated game information.

11 Claims, 17 Drawing Sheets

(56) References Cited

U.S. PATENT DOCUMENTS 5,123,649 A 6/1992 Tiberio
5,152,529 A 10/1992 Okada
5,178,395 A 1/1993 Lovell
5,655,961 A 8/1997 Acres et al.
5,655,965 A 8/1997 Takemoto et al.
5,704,835 A * 1/1998 Dietz, II .......................... 463/20
5,720,662 A * 2/1998 Holmes et al. .................. 463/20
5,758,875 A 6/1998 Giacalone, Jr.
5,828,862 A 10/1998 Singkomrat
6,012,983 A 1/2000 Walker et al.
6,045,129 A 4/2000 Cooper et al.
6,077,163 A * 6/2000 Walker et al. ................... 463/26
6,110,041 A 8/2000 Walker et al.
6,254,483 B1 7/2001 Acres
6,315,662 B1 11/2001 Jorasch et al.
6,443,456 B1 9/2002 Gajor
6,471,588 B2 10/2002 Sakamoto
6,558,255 B2 5/2003 Walker et al.
6,575,832 B1 6/2003 Manfredi et al.
6,634,922 B1 10/2003 Driscoll et al.
6,695,700 B2 2/2004 Walker et al.
6,702,670 B2 3/2004 Jasper et al.
6,780,104 B2 8/2004 Fox
6,878,064 B2 4/2005 Huang
6,939,227 B2 9/2005 Jorasch et al.
6,939,229 B2 9/2005 McClintic
6,998,806 B2 2/2006 Suzuki
7,037,195 B2 5/2006 Schneider et al.
7,105,736 B2 9/2006 Laakso
7,125,333 B2 10/2006 Brosnan
7,160,188 B2 1/2007 Kaminkow et al.
7,160,189 B2 1/2007 Walker et al.
7,169,052 B2 1/2007 Beaulieu et al.
7,201,654 B1 4/2007 Jarvis et al.
7,210,998 B2 5/2007 Kazaoka et al.
7,258,613 B2 8/2007 Lucchesi et al.
7,264,243 B2 9/2007 Yoseloff et al.
7,303,475 B2 12/2007 Britt et al.
7,355,112 B2 4/2008 Laakso
7,374,486 B2 5/2008 Baerlocher
7,458,892 B2 12/2008 Walker et al.
7,585,222 B2 * 9/2009 Muir ............................... 463/25
7,594,849 B2 * 9/2009 Cannon ........................... 463/16
7,628,691 B2 12/2009 Luciano et al.
7,806,761 B2 10/2010 Walker et al.
7,874,911 B2 1/2011 Walker et al.
7,963,844 B2 6/2011 Walker et al.
7,980,934 B2 * 7/2011 Shuster et al. .................. 463/13
8,047,908 B2 11/2011 Walker et al.
8,186,682 B2 * 5/2012 Amaitis et al. ................ 273/302
8,197,324 B2 6/2012 Walker et al.
8,475,254 B2 7/2013 Acres
2002/0082076 A1 6/2002 Roser et al.
2002/0142815 A1 10/2002 Candelore
2002/0147040 A1 10/2002 Walker et al.
2003/0017865 A1 1/2003 Beaulieu et al.
2003/0078101 A1 4/2003 Schneider et al.
2003/0092484 A1 5/2003 Schneider et al.
2003/0114217 A1 6/2003 Walker et al.
2003/0119576 A1 6/2003 McClintic et al.
2003/0130042 A1 7/2003 Ollins
2003/0137109 A1 * 7/2003 Vancura ........................ 273/292
2003/0190944 A1 10/2003 Manfredi et al.
2003/0220138 A1 11/2003 Walker et al.
2003/0232640 A1 12/2003 Walker et al.
2004/0002388 A1 1/2004 Larsen et al.
2004/0248642 A1 12/2004 Rothschild
2005/0119052 A1 6/2005 Russell et al.
2005/0215314 A1 9/2005 Schneider et al.
2005/0227760 A1 10/2005 Viazny et al.
2005/0239541 A1 10/2005 Jorasch et al.
2006/0025207 A1 2/2006 Walker et al.
2006/0052153 A1 3/2006 Viazny et al.
2006/0068903 A1 3/2006 Walker et al.
2006/0105836 A1 5/2006 Walker et al.
2006/0148559 A1 7/2006 Jordan et al.
2006/0160598 A1 7/2006 Wells et al.
2006/0160610 A1 7/2006 Potts
2006/0211496 A1 9/2006 Manz
2006/0229127 A1 10/2006 Walker et al.
2006/0237905 A1 10/2006 Nicely et al.
2006/0240890 A1 10/2006 Walker et al.
2006/0247031 A1 11/2006 Walker et al.
2006/0252510 A1 11/2006 Walker et al.
2006/0252512 A1 11/2006 Walker et al.
2006/0252519 A1 11/2006 Walker et al.
2006/0287075 A1 12/2006 Walker et al.
2007/0001396 A1 1/2007 Walker et al.
2007/0015564 A1 1/2007 Walker et al.
2007/0049369 A1 3/2007 Kuhn et al.
2007/0060254 A1 * 3/2007 Muir ............................... 463/16
2007/0060274 A1 3/2007 Rowe et al.
2007/0060295 A1 * 3/2007 DeMar et al. ................... 463/20
2007/0060323 A1 3/2007 Isaac et al.
2007/0060334 A1 3/2007 Rowe
2007/0066377 A1 3/2007 Van Asdale
2007/0087822 A1 4/2007 Van Luchene
2007/0105612 A1 5/2007 Fotevski
2007/0105615 A1 5/2007 Lind
2007/0106553 A1 5/2007 Jordan et al.
2007/0111772 A1 * 5/2007 Shuster et al. .................. 463/11
2007/0180371 A1 8/2007 Kammler
2007/0184896 A1 8/2007 Dickerson
2007/0205556 A1 9/2007 Roemer et al.
2007/0218974 A1 9/2007 Patel et al.
2007/0254732 A1 11/2007 Walker et al.
2007/0281775 A1 12/2007 Kashima
2008/0026826 A1 1/2008 Groswirt
2008/0070695 A1 3/2008 Baerlocher et al.
2008/0096632 A1 4/2008 Okada
2008/0096636 A1 4/2008 Power
2008/0102946 A1 5/2008 Amour
2008/0113749 A1 5/2008 Williams et al.
2008/0113777 A1 5/2008 Anderson
2008/0132328 A1 6/2008 Yoshioka
2008/0153580 A1 6/2008 Beadell et al.
2008/0161085 A1 7/2008 Hansen
2008/0161099 A1 7/2008 Sines et al.
2008/0182655 A1 7/2008 DeWaal et al.
2008/0220861 A1 9/2008 Okada
2008/0242394 A1 10/2008 Sakuma
2008/0280674 A1 11/2008 Sakuma
2008/0287186 A1 11/2008 Sakuma
2008/0318656 A1 12/2008 Walker et al.
2009/0117981 A1 5/2009 Yoshizawa
2009/0137312 A1 5/2009 Walker et al.
2009/0233682 A1 9/2009 Kato et al.
2009/0325669 A1 12/2009 Kelly et al.
2009/0325670 A1 12/2009 Kelly et al.
2010/0056248 A1 3/2010 Acres
2010/0075741 A1 3/2010 Aoki et al.
2010/0130280 A1 5/2010 Arezina et al.
2010/0285867 A1 11/2010 Okada
2011/0053675 A1 3/2011 Aoki et al.
2011/0117987 A1 5/2011 Aoki et al.
2011/0183753 A1 7/2011 Acres et al.
2011/0281632 A1 11/2011 Okada
2011/0294563 A1 12/2011 Jaffe
2012/0077565 A1 3/2012 Barbalet
2012/0115566 A1 5/2012 Fujisawa et al.
2012/0172108 A1 7/2012 Acres
2012/0172130 A1 7/2012 Acres
2012/0190425 A1 7/2012 Barbalet

FOREIGN PATENT DOCUMENTS

EP 1 170 041 A2 1/2002
EP 1 938 872 A2 7/2008
WO 2005029279 A2 3/2005
WO 2005029287 A2 3/2005
WO 2005099841 A1 10/2005
WO 2006104731 A2 10/2006
WO 2006121663 A2 11/2006

(56) References Cited

FOREIGN PATENT DOCUMENTS

| | | | |
|---|---|---|---|
| WO | 2006135608 | A2 | 12/2006 |
| WO | 2008024705 | A2 | 2/2008 |
| WO | WO 2008/024556 | A2 | 2/2008 |
| WO | 2008027429 | A2 | 3/2008 |

OTHER PUBLICATIONS

Acres, John, The Future of Gaming, Where Will You be in 10 Years?, Slot Operations Management / Casino Enterprise Management, Jul. 2007, pp. 8-10, 12.

* cited by examiner

GAMING DEVICE HAVING ADVANCE GAME INFORMATION ANALYZER

RELATED APPLICATIONS

This application is commonly assigned with U.S. patent application Ser. No. 12/630,752, to John F. Acres, filed concurrently herewith, for RAPID PLAY POKER GAMING DEVICE. The disclosure of the above-listed application is incorporated herein by reference in its entirety for all purposes.

FIELD OF THE INVENTION

This disclosure relates generally to electronic gaming devices, and more particularly to gaming devices that are configured to analyze advance information about a game.

BACKGROUND

Gambling sessions typically include various winning gaming results and numerous losing gaming results that are each displayed on a gaming device. Since a portion of the winning gaming results are much larger in value than the wagers placed to reach those results, and because the overall payback percentage of the gaming device must be less than 100% to pay for the administrative costs of operating the gaming device, these gambling sessions usually include many more losing gaming results than winning gaming results.

As a consequence of this dichotomy, a great portion of time on a gaming device is spent watching reels spin (or poker hands played) with a resulting loss. For most players, the excitement and gratification of gambling is tied to achieving wins. While these players will endure certain periods of loss, players will often press the spin and/or bet buttons as quickly as possible to pass through the losses to get to another win. While it is in a casinos interest to provide as much excitement and entertainment as possible to its players, the casino must also limit the number of wins in order to cover costs and return a profit, which effectively limits how many wins can be paid to a player.

In all of today's games, losses take nearly as long as wins to display. While there is sometimes player anticipation tied to showing several reels with a particular symbol on a payline (or showing multiple cards needed for a large win in video poker) where the gaming result ultimately ends in a loss, most of the time it is quickly evident to the player that they have little or no chance of receiving a winning outcome. Once the player realizes that the current game will result in a loss, the player either has to wait for the remaining reels to come to rest or can sometimes "slam" the rest of the reels to a stop by hitting the spin button again before waiting for the game to reset and being able to initiate another game. Thus, with conventional gaming devices, players often spend a least half of their gambling sessions going through losing gaming results.

This problem is compounded by games that utilize player interactions. In addition to spending time displaying game events to the player, the gaming device must also wait for the player to make decisions during game play. Even when there is little hope of ending up with a winning outcome, these games must wait for a player to make decisions that in the end will not make much if any difference in the game outcome. From a player's perspective, these games can also be frustrating since they often times know that they have little chance of ending up with a winning game outcome. Hence, there exists a need for gaming devices that eliminates time spent on games with no or small wins while emphasizing games that have a greater chance of being profitable to the player. This increase in game speed simultaneously provides the standard games and paytables players prefer while increasing the hourly profits earned by casinos.

DETAILED DESCRIPTION

Figure 1A:
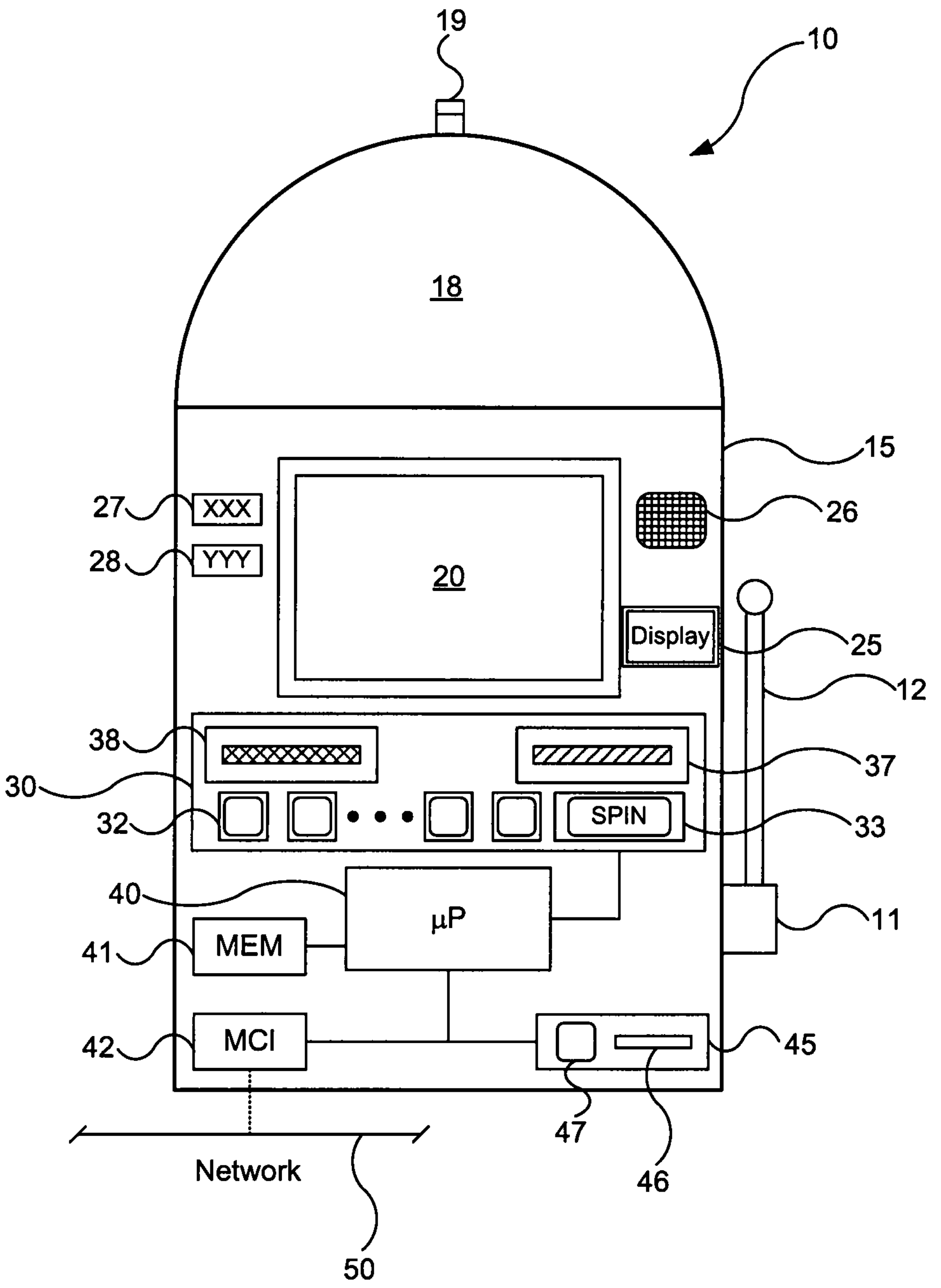
FIG. 1A is a functional block diagram that illustrates a gaming device according to embodiments of the invention.
Figure 1B:
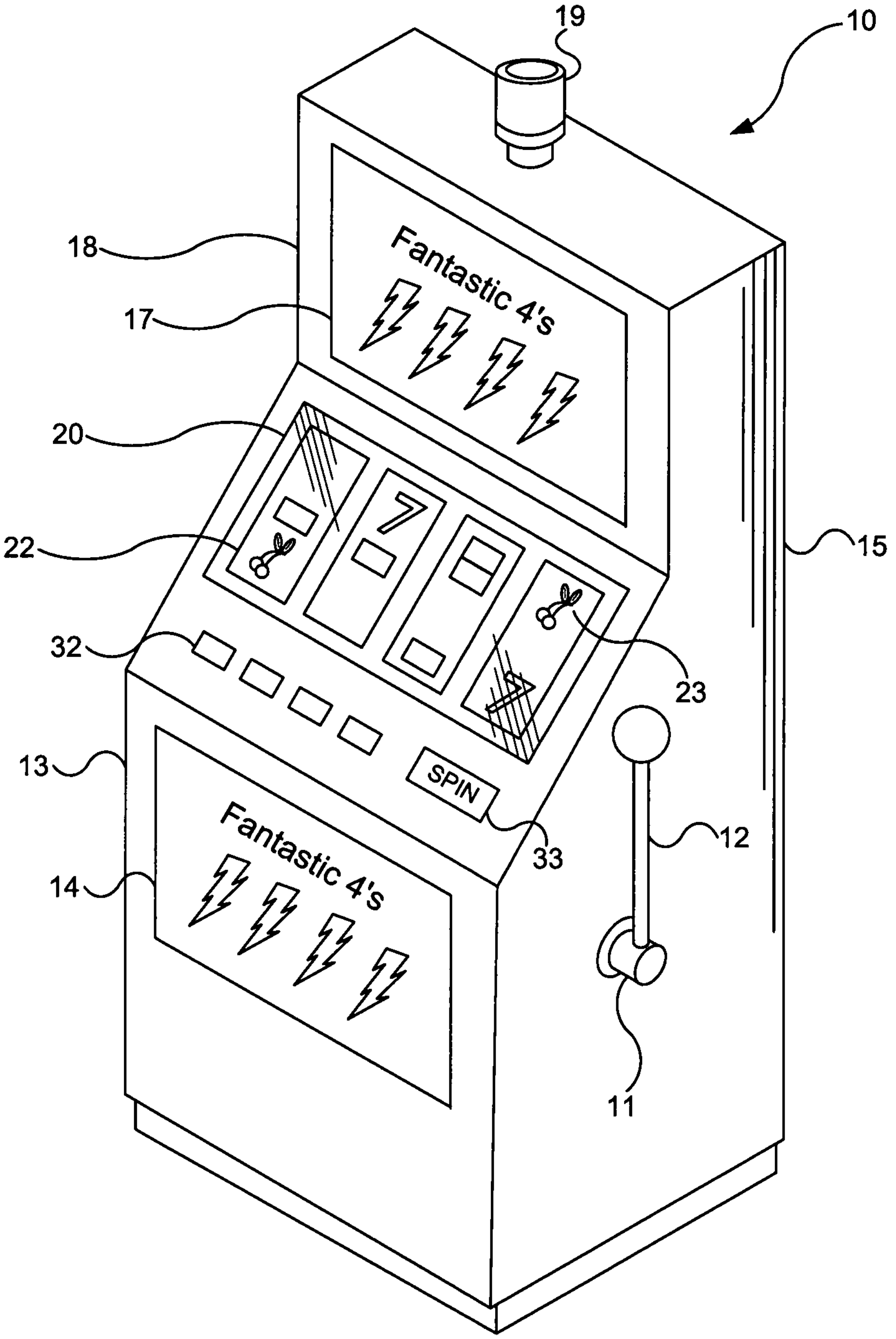
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28.

The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cashout.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window." Another example is Las Vegas Gaming Incorporated's retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

A player typically plays the gaming device 10 by placing a wager and activating an input mechanism to initiate a game associated with the placed wager. As used herein, a gaming event refers to any activity that affects the calculation or display of a game outcome. Game events include interactions occurring between the gaming device 10, the player, and/or a connected game system. Example gaming events include a player inserting a player account card in a gaming device, a double-pay bonus time period activation, a first spinning reel coming to a stop, a player's input to hold a card in a poker hand, etc. A game refers to the calculation and completion of one game outcome. That is, a game includes a single game cycle that begins with the initiation of the wagered upon game and ends with the completion of all activities relating to the wager placed including any intervening bonuses. In other words, a game encompasses all gaming events dependent on a placed wager during an initiated game including all amounts due the player that are paid directly by the gaming machine, or as a manual payment by casino personnel to the player playing that gaming machine. For example, if an item was awarded as a result of a wager that could be saved and used later, the game would encompass the awarding of the item, which is part of the game outcome, but not the later use of that item since the later use would affect a different game outcome. A game session refers to one or more played games. For example, a game session for a particular player may include each game played on a specific gaming device, each game played between insertions of money or credits, each game played between an initial money or credit insertion and a cash-out or zeroing out of credits, each game played during a casino stay, or each game played over a predetermined time period. Alternatively, game sessions may refer to games played by multiple players over a specified time period or event period with respect to a particular gaming device or group of gaming devices.

The player may initially insert monetary bills or previously printed tickets with a credit value into the bill acceptor 37. The player may also put coins into a coin acceptor (not shown) or a credit, debit or casino account card into a card reader/authorizer (not shown). In other embodiments, stored player points or special 'bonus points' awarded to the player or accumulated and/or stored in a player account may be able to be substituted at or transferred to the gaming device 10 for credits or other value. For example, a player may convert stored loyalty points to credits or transfer funds from his bank account, credit card, casino account or other source of funding. The selected source of funding may be selected by the player at time of transfer, determined by the casino at the time of transfer or occur automatically according to a predefined selection process. One of skill in the art will readily see that this invention is useful with all gambling devices, regardless of the manner in which wager value-input is accomplished.

The credit meter 27 displays the numeric credit value of the money or other value inserted, transferred, or stored dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The game may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a game.

If the game does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
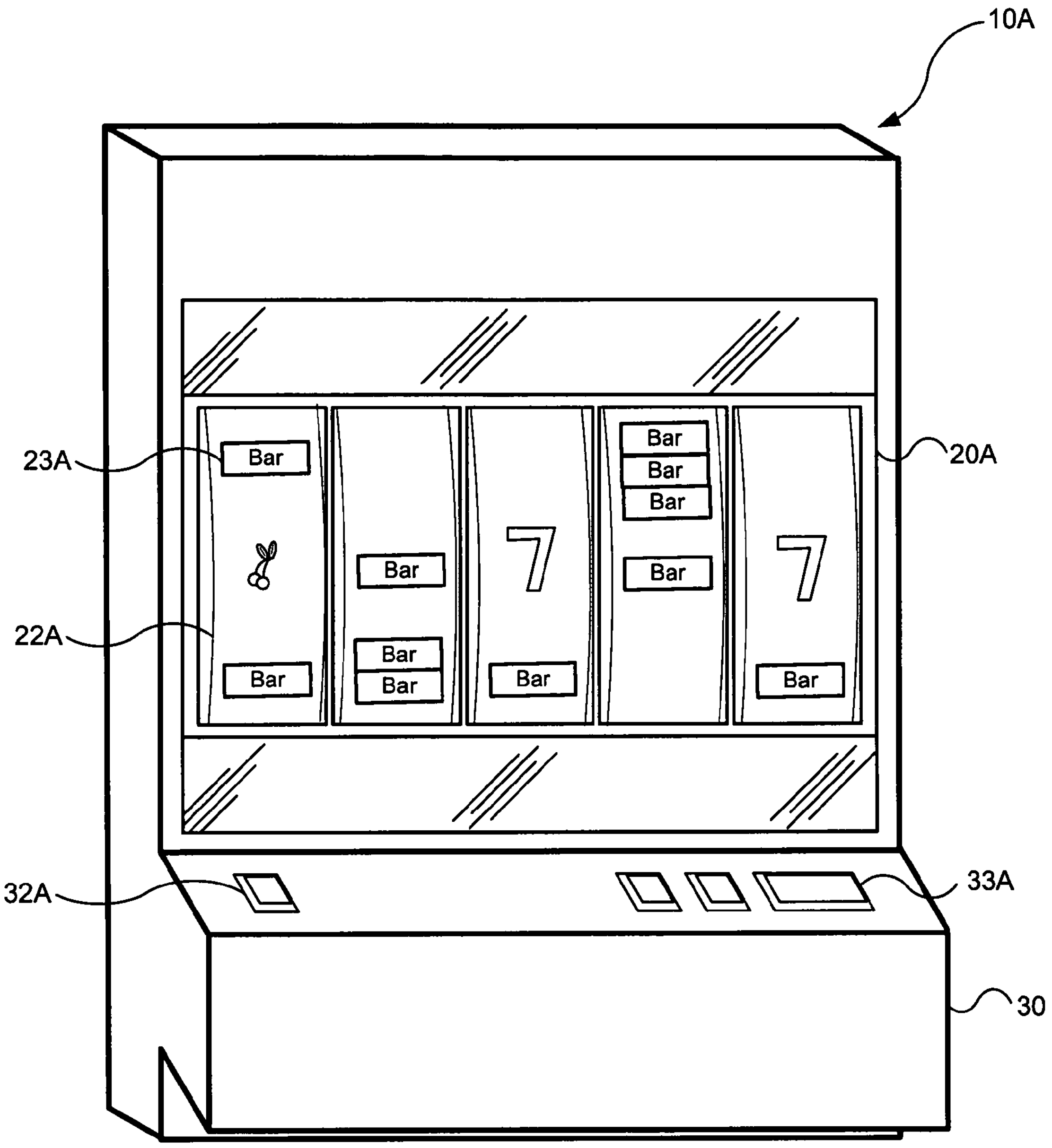
FIGS. 2A, 2B, and 2C are detail diagrams of exemplary types of gaming devices according to embodiments of the invention.
Figure 2B:
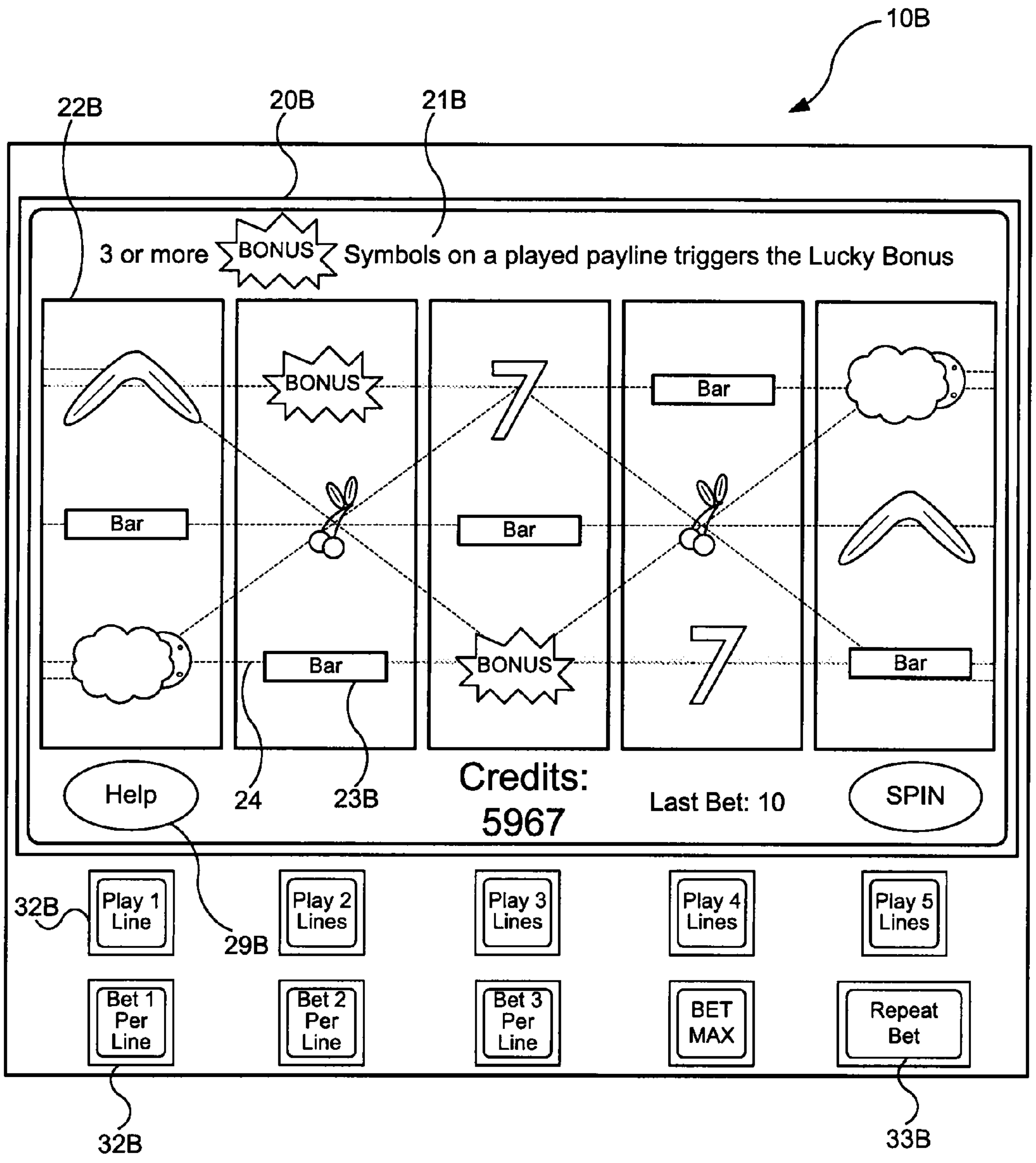
Figure 2C:
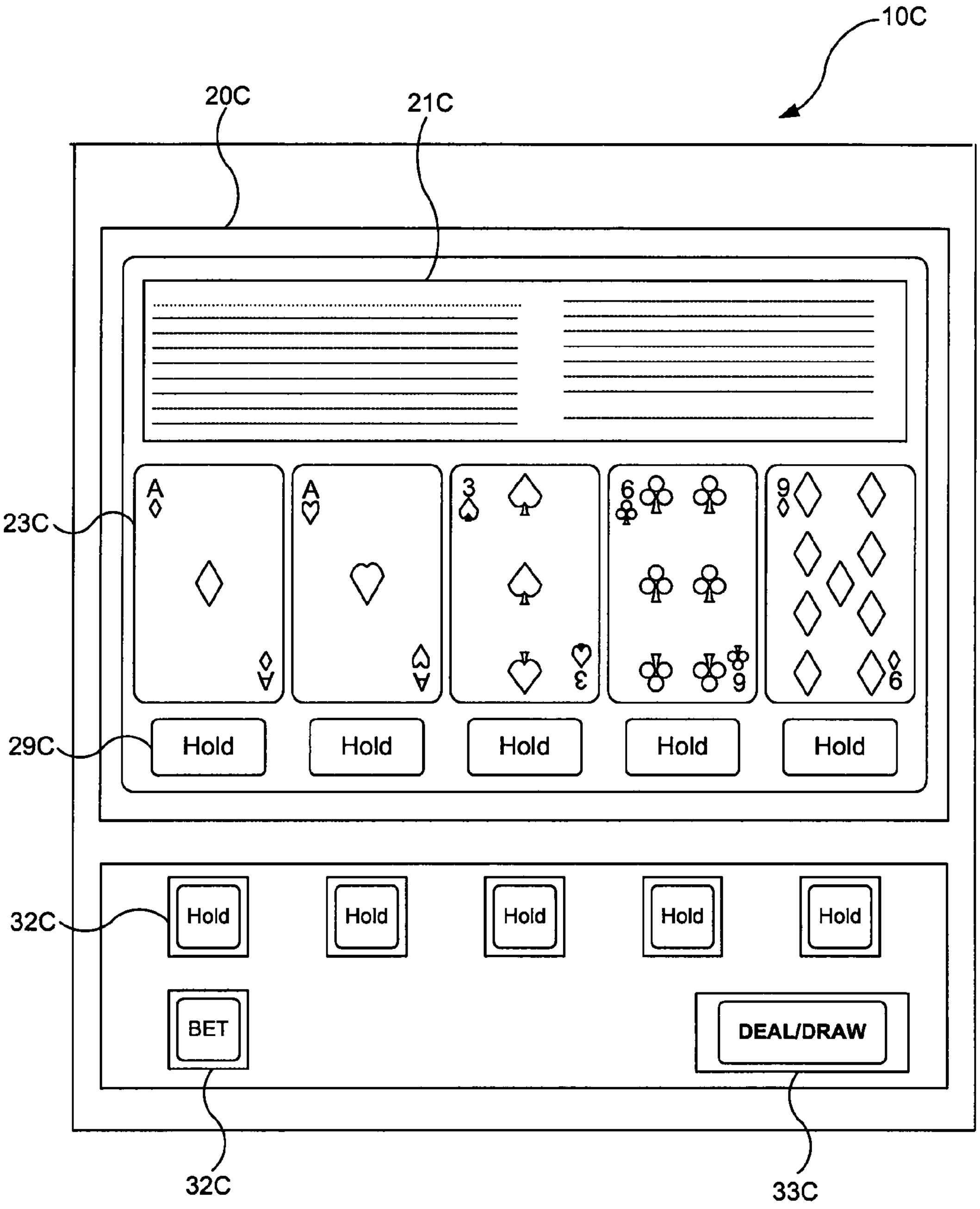

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A game on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touch-screen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the games. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the game ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five games, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a game. A repeat bet or spin button 33B may also be used to initiate each game when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touch-screen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a game after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3:
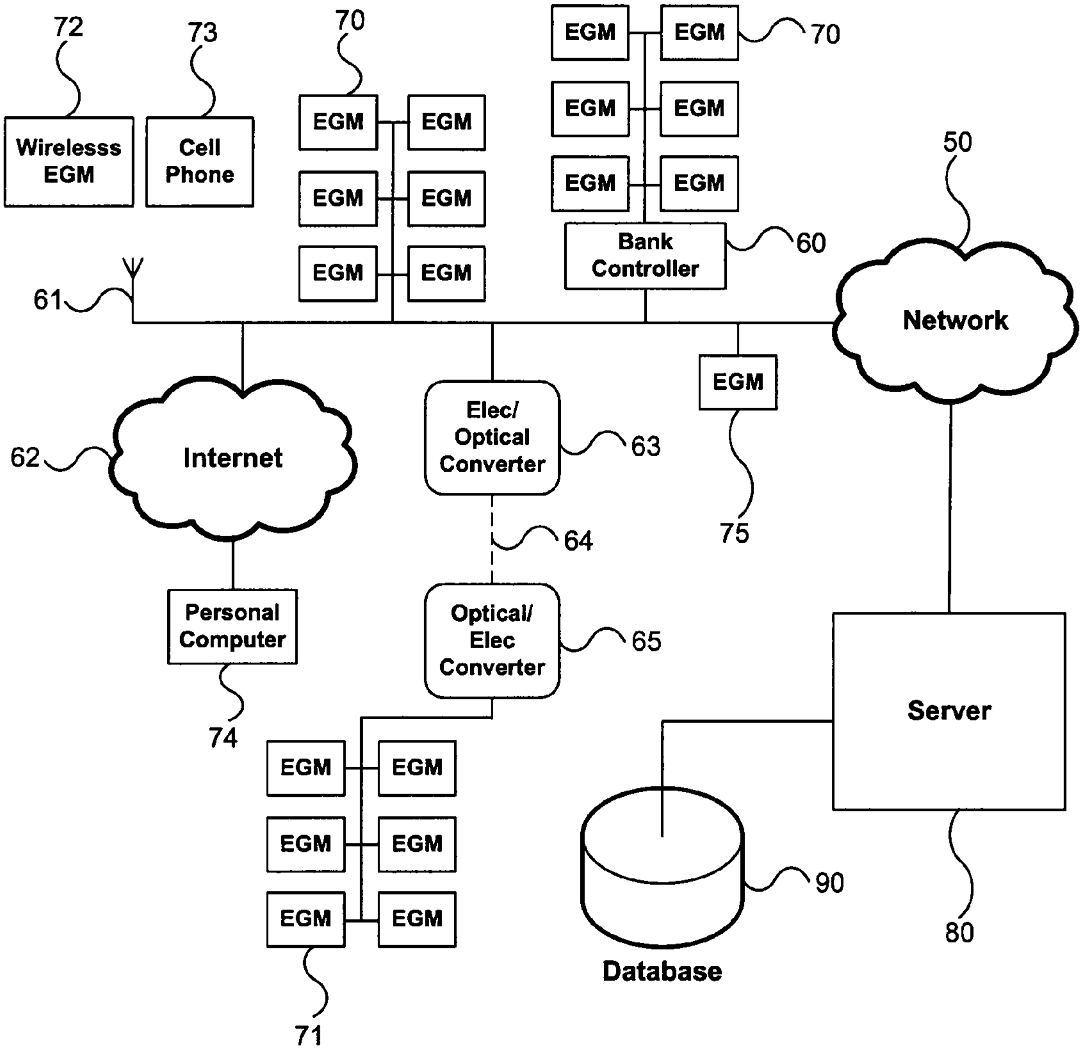
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11 a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

As discussed above, players often spend much of their gaming time passing through losses to reach more exciting wins. One way to improve the appeal of gaming machines is to sell games, not as individual transactions, but as a sequence or session of transactions in which an emphasis is placed on winning game outcomes or interesting game play, while losing outcome and/or boring game play is minimized.

Embodiments of this concept are directed to methods of operating a gaming device to analyze game information that is part of a game or set of games in advance of game play of the game or games to make a determination about how game play will proceed. In an example video poker embodiment, the gaming device will analyze both the dealt cards and the possible cards used on a draw. The game play determination may include whether or not to "Fast Forward" the game, the speed of game play, and the ability of a player to draw cards from a plurality of facedown cards. In a video keno embodiment, a game may be played such that only a portion of the winning spots are revealed (say 10 of the 20) and the player is then given the option to change their unmatched selections to other non-win-indicated numbers, or make additional picks. However, all 20 winning numbers may already be known to the gaming device. In a slot machine embodiment, a slot machine may stop a portion of the reels of a game, before letting a player make a side bet, alter their current bet, surrender for a portion of their bet, or otherwise interact with the game.

Patent application Ser. No. 12/204,633, filed Sep. 4, 2008, entitled GAMING DEVICE HAVING VARIABLE SPEED OF PLAY (herein referred to as "the '633 application"), is hereby incorporated herein by reference. The '633 application discloses multiple embodiments that vary the speed of game play for gaming devices to emphasize more valuable winning outcomes. This includes varying the speed of the both the game events within the game itself and the duration that a game outcome is displayed. Some of the embodiments of the '633 application make the determination about how to proceed with game play based only on the direct game result of an initiated game. On the other hand, embodiments of this concept analyze various factors related to game play, as well as analyzing game information prior to and following player interactions during games and game information for multiple games.

As discussed in the '633 application, varying the speed of game play can be embodied in many different formats across different gaming platforms. Some of these embodiments vary the game speed by rapidly playing through losing gaming events and automatically initiating a subsequent gaming event without further player interaction. As wins and bonuses are more exciting events for a player, gaming events with winning outcomes may be conducted over a longer period of time so that the player can enjoy the win. Since losses make up a large part of gaming results as discussed above, overall game speed is significantly increased. These and other features of the present concept are discussed more fully below in exemplary embodiments, which are discussed with reference to the drawings.

As a result of the just-described processes, games which result in losses or small wins may be played very quickly. Only games with potential wins equal to, or above, the designated threshold specified by the predefined criterion are played by players and this play occurs at normal speed. Because losses and small wins are a very large portion of all game outcomes, however, overall game speed is significantly increased and players are not burdened with playing out hands with small or no win possibilities.

By implementing embodiments of this concept, player enjoyment may increase since game play is focused on winning or otherwise positive poker hands while losing hands and small win hands do not have to be played. In addition, the speed of game play can be greatly increased because games with losing hands and hands with small wins are completed at a much faster rate through the non-preferred game sequences. Since overall game speed is partially determined by how quickly the player starts each subsequent game, even faster game play can be accomplished by utilizing embodiments where a second or subsequent game is initiated immediately following the completion of the prior game for so long as credits remain to fund play. As described in the '633 application, the wager size of the prior game may be repeated in each subsequent game. The player may be able to pause or stop this automated play at any time by pressing a designated button.

In other embodiments a delay is placed after each automatically completed game before the next game starts, and another delay, equal or different to the first delay period, is placed after each player-completed game before the next game is restarted. In some of these embodiments the amount of the delay varies according to the prior game outcome. For example, the delay time depends upon the amount won. Here, the delay time may correspond to the time it takes to roll up the awarded credits on the credit meter.

In other embodiments, a new game is initiated almost instantly after completion of each losing or small win hand that is played by the game itself, but is not initiated following a player-completed game. As described in the '633 application, this win seeking embodiment allows player to quickly move through losing and low paying games while being able to savor the higher paying games. Here, the player must restart game play after playing a potentially larger winning poker game by pressing a designated button, such as game initiation button.

In another embodiment, the player is provided the ability to select between playing a standard game, that is a game in which no games are automatically played, and the rapid play mode. A designated rapid play button and a single play button may both be implemented on a gaming device to accomplish this feature. In other embodiments, the player may activate a switch or make a selection in a game menu to change between poker game modes.

In another embodiment, the player may select the award level of wins used as the threshold value for the predefined criteria in determining which games are to be automatically played. In another embodiment, the player may choose how quickly each automatically played game is completed, and/or how long the delay is between the time one game is completed and the next game begins. In order to incentivize the player to play rapidly, the paytable could vary according to how fast the games are played. For example, games initiated using the rapid play button may utilize a higher paying paytable than a paytable used for a game initiated using the single game button. Additionally, higher paying paytables may be used when the player selects a minimal inserted delay between games. Further, higher awards may be available when a longer series of games is played in rapid play mode. These awards may be progressive in nature such that they increase the longer rapid play gaming is used and are reset if a conventional game mode is used, or the player leaves the gaming device 100.

Figure 4:
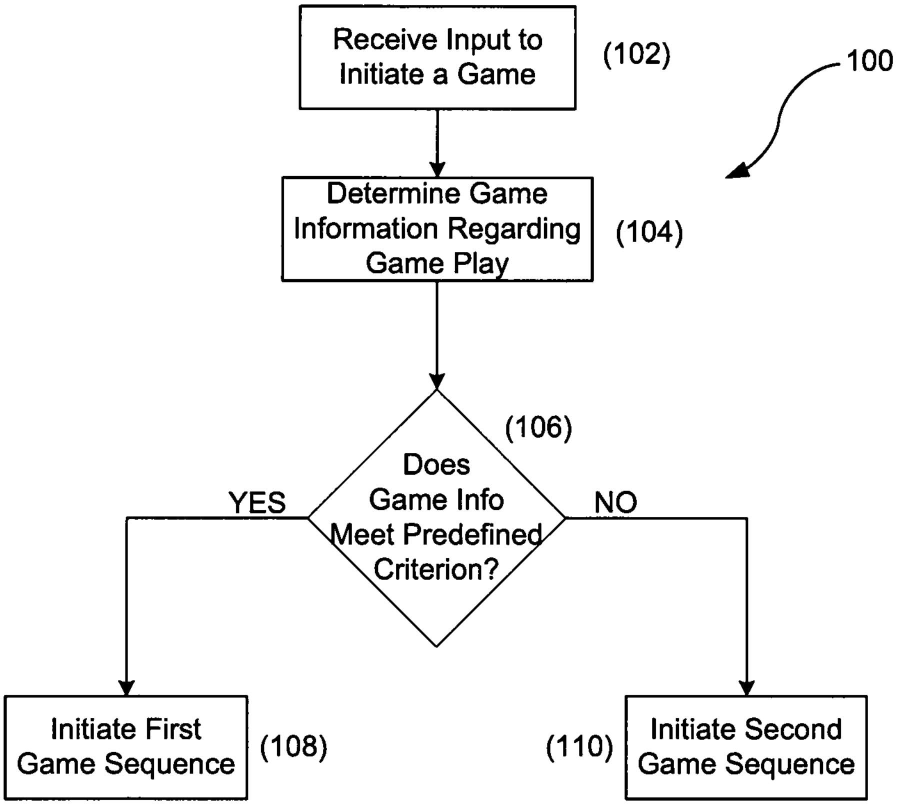
FIG. 4 is a flow diagram of a method of operating a gaming device according to embodiments of the invention.

FIG. 4 is a flow diagram of a method of operating a gaming device according to embodiments of the invention. FIG. 4 represents a broad overview of some of the embodiments of the invention.

Referring to FIG. 4, flow 100 begins when an input to initiate a game is received by the gaming device in process (102). In process (104), advanced game information is determined about the game play of future games. As discussed above, this game information includes information about the game that is initiated in process (102) and may include game information about subsequent games after the initiated game. Next, process (106) determines if the game information meets at least one predefined criterion. The predefined criterion may include threshold award amounts associated with the game outcome or game outcomes, probabilities in receiving a winning outcome, perceived enjoyment of playing the game, etc. If the game data meets the predefined criterion, a first game sequence is initiated on the gaming device in process (108). In contrast, if the game data does not meet the predefined criterion, a second game sequence is initiated on the gaming device in process (110).

Figure 5:
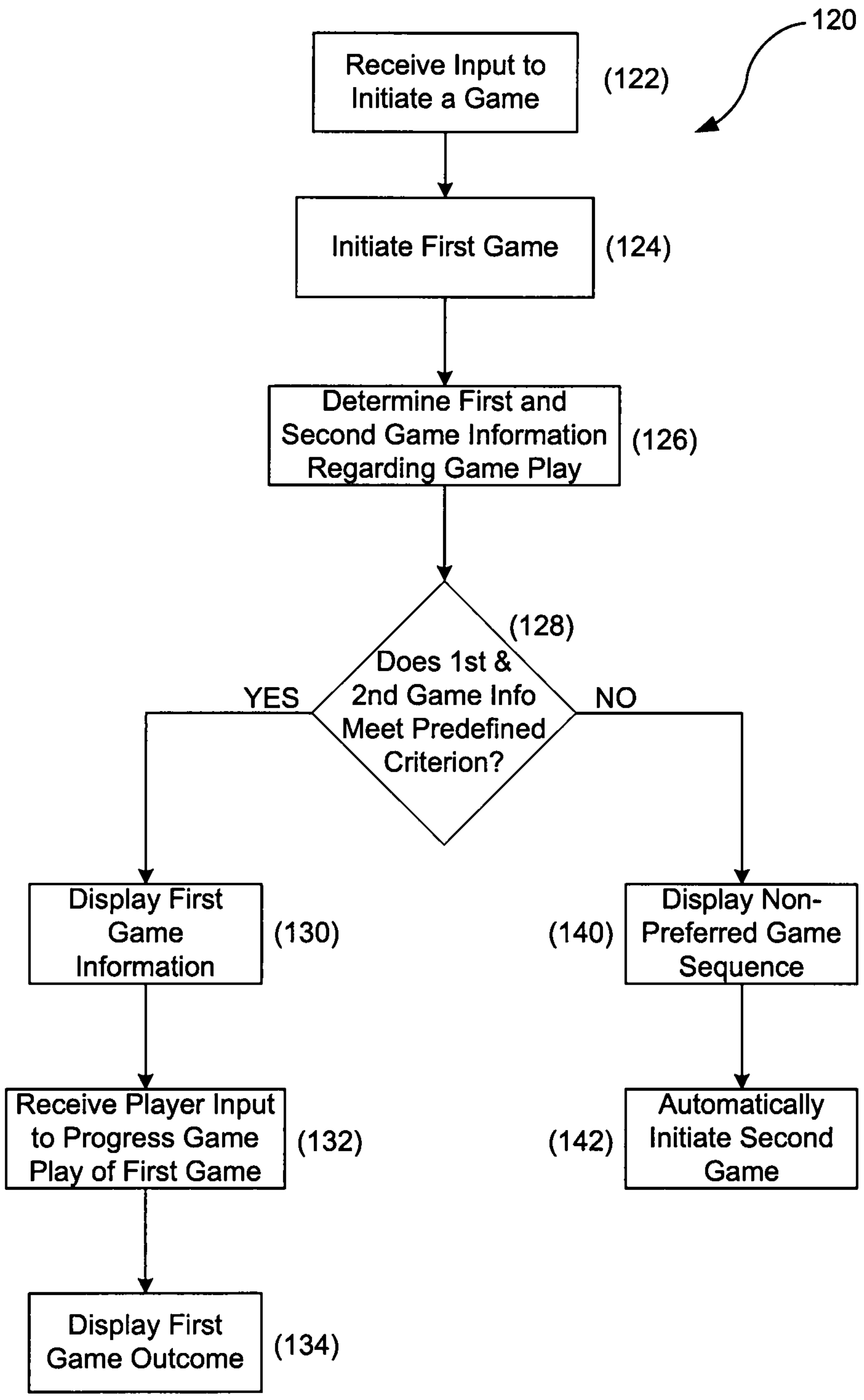
FIG. 5 is a flow diagram of a method of operating a gaming device according to embodiments of the invention.

FIG. 5 is a flow diagram of a method of operating a gaming device according to embodiments of the invention. FIG. 5 represents a method of playing a game that includes player interaction during the game.

Referring to FIG. 5, flow 120 begins when an input to initiate a game is received by the gaming device in process (122). In process (124), a first game is initiated in response to the input received in process (122). First and second game information regarding game play of the first game is determined in process (126). Here, first game information includes game information that is to be displayed to a player prior to the player's interaction with the gaming device, and second game information includes game information that may be reached based on the player's interaction with the gaming device.

In process (128) it is determined whether the first and second game information meets at least one predefined criterion. Again, the predefined criterion may include a variety of different metrics. Here, the predefined criterion may include whether the first and second game information give the player the possibility of reaching a winning outcome or whether the first game information is sufficient to allow the player to have an enjoyable game experience. For example, even if an analysis of the first and second game information reveals that a win is not possible, it may be determined that the first game information includes game data that is a near miss, or in other words, nearly a winning outcome. In this situation, the player may be excited to play the game because of the anticipation of a significant win. In a video poker game device, for instance, first game information may indicate that the dealt hand includes four out of the five cards necessary to complete a royal flush. Even though the second game information does not indicate that a royal flush will be won, the player may enjoy playing this game because of the possibility of winning the large award. In a video keno gaming device, in another instance, the player may be shown that three of their ten picks have matched selected spots after ten of the twenty random spots are revealed. Here, the player may not match any more selected spots, but the player may feel that they are close to a significant winning outcome.

If it is determined that the first and second game information meets the predefined criterion, the first game information is displayed to the player in process (130). The player is then requested to interact with the gaming device in the gaming device waits to receive the requested player input to progress the game play of the first game in process (132). As discussed above, this player interaction may include holding and drawing cards in a video poker embodiment, adding or changing picks in a video keno embodiment, selecting a reel to respin in a slot machine embodiment, choosing to hit or hold a hand in a blackjack embodiment, etc. After the player interaction, the first game outcome is displayed based on the first and second game information in process (134).

If it is determined that the first and second game information does not meet the predefined criterion, a non-preferred game sequence is displayed in process (140). Here, the non-preferred game sequence may include briefly displaying the first game information and at least a portion of the second game information without allowing any player interaction. A slight delay may be included to this sequence to allow the player a short time to observe the losing parts of the game. Alternatively, the non-preferred game sequence may simply be to display nothing and move to the next game. After the non-preferred game sequence is displayed, a second game is automatically initiated in process 142. This automatic initiation may be similar to the embodiments described in the '633 application.

Multiple Games

Figure 6:
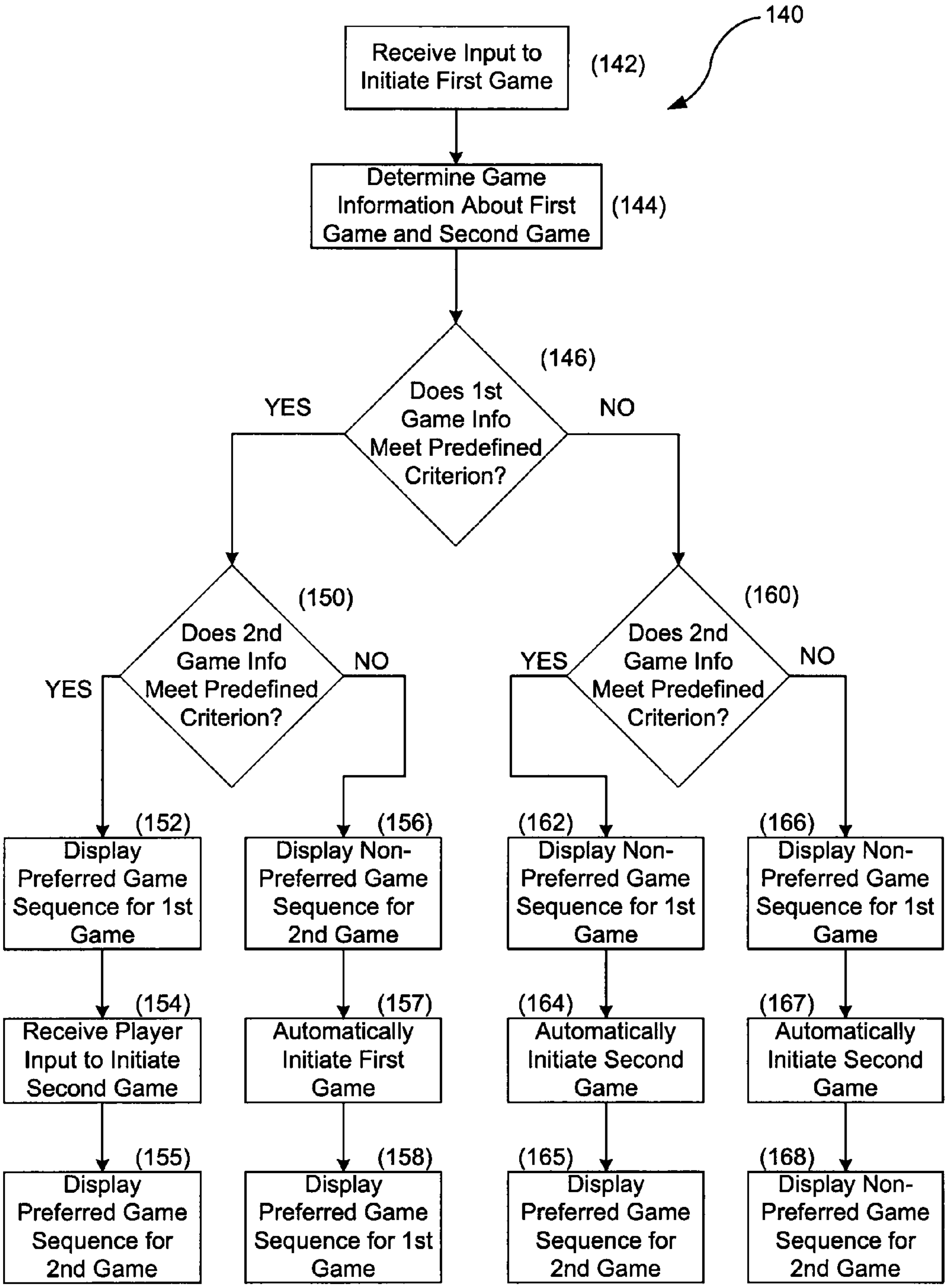
FIG. 6 is a flow diagram of a method of operating a gaming device according to embodiments of the invention.

FIG. 6 is a flow diagram of a method of operating a gaming device according to embodiments of the invention. FIG. 6 represents a method of examining game information for multiple games and making game play choices for the multiple games prior to having a player play the games.

Referring to FIG. 6, flow 140 begins when an input to initiate a game is received by the gaming device in process (142). In process (144), game information is determined about both the currently initiated game (the first game) and a subsequent game (the second game) in process 144. Although the embodiment illustrated in FIG. 6 only discussed determining the game information of one future game that has not yet been initiated, other embodiments may analyze game information of multiple future games that have yet to be initiated. The group of games that has their game information analyzed at once may be referred to as a set of games.

One issue in analyzing future games is that there is sometimes no guarantee that the player will play these games. The player may cash-out before these games are ever initiated. Hence, some embodiments will only include a few games in a game set and confirm that the player has sufficient credits available on the credit meter to cover wagers on each of the games in the game set at the player's current wager level. The player may or may not be aware of the analysis and reconfiguration of future games. When the player is aware of the analysis of multiple future games or the player initiates a game button associated with multiple games, such as described by embodiments in patent application Ser. No. 12/509,319 titled GAMING DEVICE HAVING MULTIPLE GAME PLAY OPTION, filed Jul. 24, 2009, which is hereby incorporated herein by reference, the player may be more likely to anticipate the changes to the game play of the games in the game set. Thus, even when they are not initiating multiple games at once, they are likely to play each of the games in the game set, especially if there is a possibility that the games are rearranged such that games associated with winning outcomes are displayed later in the game set. In some embodiments, players are able to set a preferred number of games to be analyzed in a game set or set a maximum number of games to be analyzed in a game set.

When players are not aware of the multiple game analysis, game play may seem no different than playing each of the multiple games individually. However, the ability to manipulate the game play of multiple games may provide the flexibility to emphasize certain aspects of game play or to allow game play to be reactionary to recent game events. For example, if recent game play has resulted in several consecutive games with losing outcomes, the analysis of a set of ten games with seven losing games followed by two winning games and ending on a losing game, allows the game device to rearrange the order of the games so that at least one of the winning games is moved up in the game play order of the game set to keep the player's interest in the game.

If the player leaves the gaming device prior to initiating each game in the game set, the gaming device may retain the game information for the remaining games in the game set so that the next player playing the game device will be presented with the remaining games in the game set. In other embodiments, the remaining games in the game set may be discarded if a player ends her game session. A new analysis would then be completed for a new game set when a new player begins a new game session on the gaming device.

Returning back to flow 140, process (146) determines whether the game information for the first game meets the predefined criterion. If the game information for the first game meets the predefined criterion, process (150) determines whether the game information for the second game meets the predefined criterion. If the game information for the second game also meets the predefined criterion, the gaming device displays a preferred game sequence for the first game in process (152). The preferred game sequence may include displaying all of the gaming events and the game outcome, as well as letting the player interact with the game if applicable. After the first game is completed, the gaming device waits to receive a player input to initiate the second game in process (154). Once the player initiates the second game, the gaming device displays a preferred game sequence for the second game in process (155).

When the game device determines that the game information for the first game meets the predefined criteria, but the game information for the second game does not meet the predefined criteria, the game device reorders the first and second game and displays a non-preferred game sequence for the second game in process (156). The gaming device then automatically initiates the first game in process (157) and displays a preferred game sequence for the first game in process (158).

When the game device determines that the game information for the first game does not meet the predefined criteria, but the game information for the second game does meet the predefined criteria, the game device displays a non-preferred game sequence for the first game in process (162). The gaming device then automatically initiates the second game in process (164) and displays a preferred game sequence for the second game in process (165).

When the game device determines that the game information for both the first and second game does not meet the predefined criteria the game device displays a non-preferred game sequence for the first game in process (166). The gaming device then automatically initiates the second game in process (167) and displays a non-preferred game sequence for the second game in process (168).

Slot Gaming Devices

Slot gaming devices often times do not have player interactions during the game. Embodiments of this concept that analyze game information for multiple games can be of course used with slot machines. In addition, embodiments of this invention that analyze a game outcome or another aspect of the game information and alter the game play of the game may be used with slot machines. For slot machine embodiments that utilize one or more player interactions, this concept also covers the analysis of game information to be displayed prior to and following the player interaction, as well as the determination of whether to alter the game play of the game based on the analysis.

Slot machine embodiments that utilize a player interaction include slot gaming devices that allow a player to hold a reel for several games or spins and slot gaming devices that stop a portion of the reels and allow the player to place an additional wager or surrender a portion of their initial wager. Some embodiments may let the player select which of the reels to initially stop prior to the player interaction. One such embodiment is illustrated in FIGS. 7A-7D and is discussed below in detail. However, many different embodiments are contemplated and fall within the scope of this concept.

FIGS. 7A, 7B, 7C, and 7D are detail diagrams of a display of a slot gaming device during a game according to embodiments of the invention.

Figure 7A:
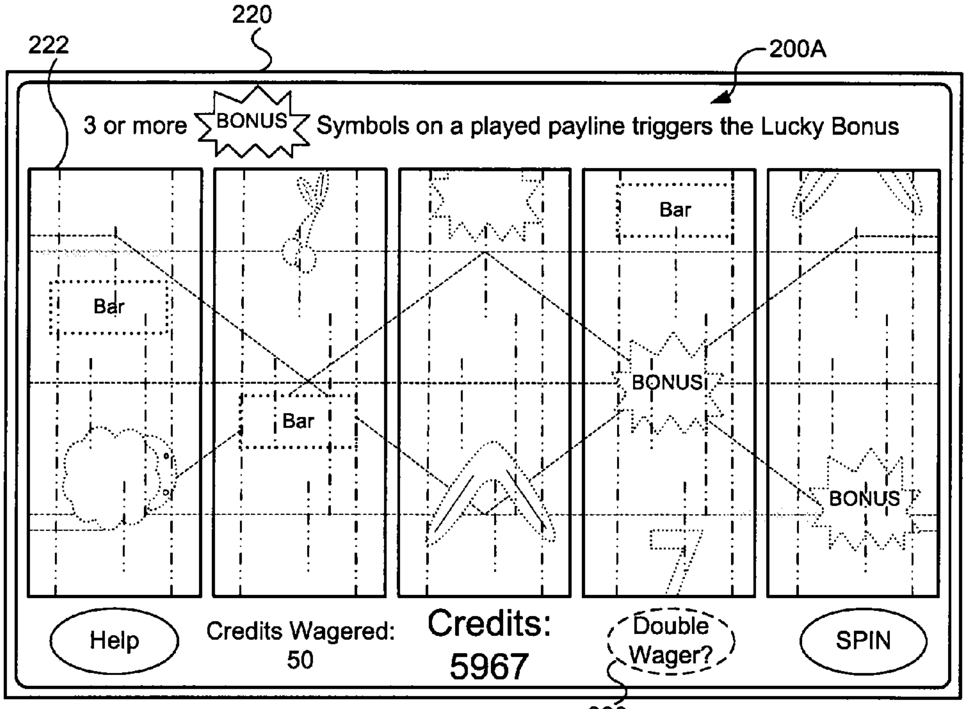
FIGS. 7A, 7B, 7C, and 7D are detail diagrams of a display of a slot gaming device during a game according to embodiments of the invention.

Referring to FIG. 7A, a gaming display 220 of gaming device 200A includes five reels 222. Here, the player has pressed a game initiation button and all of the reels are currently spinning. Once the game has been initiated, first and second game information is analyzed to determine if a preferred or non-preferred game sequence is to be displayed. As discussed above, a preferred game sequence may be displayed when the first and second game information meet a predefined criteria. In this embodiment, the game device randomly stops one or more of the spinning reels and allows the player to double their wager based on the stopped game reels. A preferred game sequence includes spinning all of the reels, stopping one or more of the reels, allowing the player to double their wager, and stopping the remainder of the reels after the player has made a decision or a time window for a selection has closed. A non-preferred game sequence spins the reels for a relatively short time, stops all of the reels briefly to show the game outcome, and automatically initiates another game. A double wager soft button 229 on the game display 222 remains inactive while the reels initially spin. Note that the player has wagered 50 credits on the game and has a credit meter balance of 5967 credits.

The first game information in this embodiment includes information regarding the reel stop positions of the reels that are initially stopped prior to allowing the player to double their wager. The second game information includes the reel stop positions of the reels that are not stopped until after the player is allowed to interact with the gaming device. As discussed above, the determination of whether the first and second game information meets the predefined criterion is not limited to whether or not an award is associated with the game outcome. Rather, the determination may include whether the stopped reels prior to the player interaction (i.e., the first game information) will still allow for the possibility of a winning outcome.

Figure 7B:
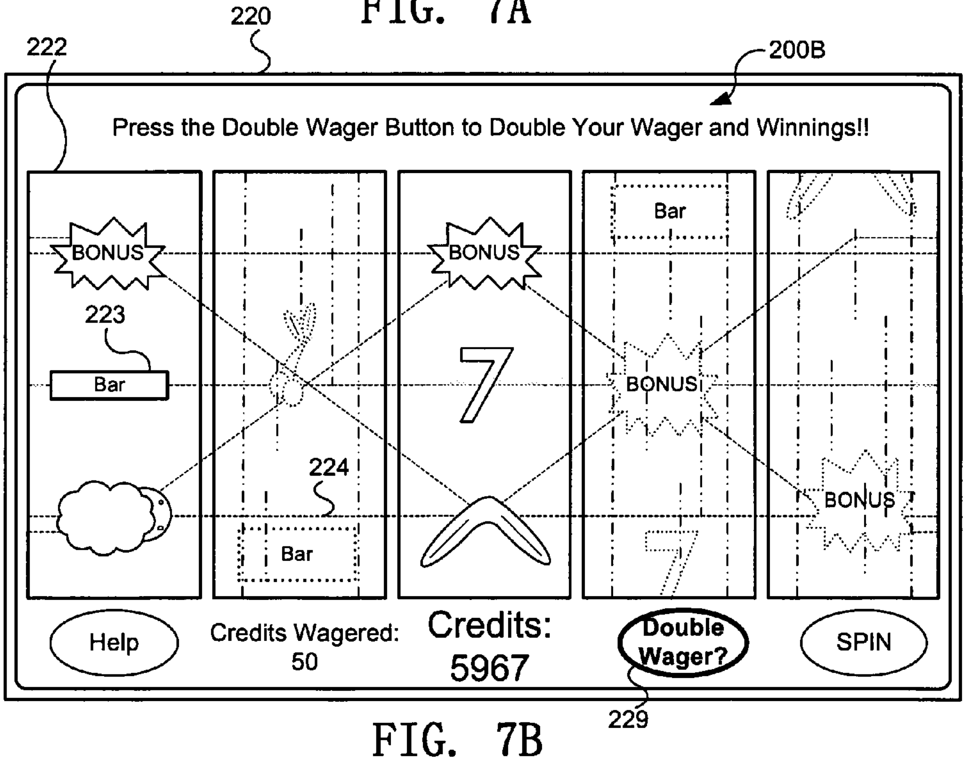

Referring to FIG. 7B, reels one and three of game device 200B have stopped in response to the first game information. The double wager button 229 has also been activated to allow the player to double their wager based upon the stopped reels. In this illustrated embodiment, the player may note that it is possible for three or more bonus symbols to appear on a payline 224. Thus, a player may be interested in changing or doubling their wager.

Figure 7C:
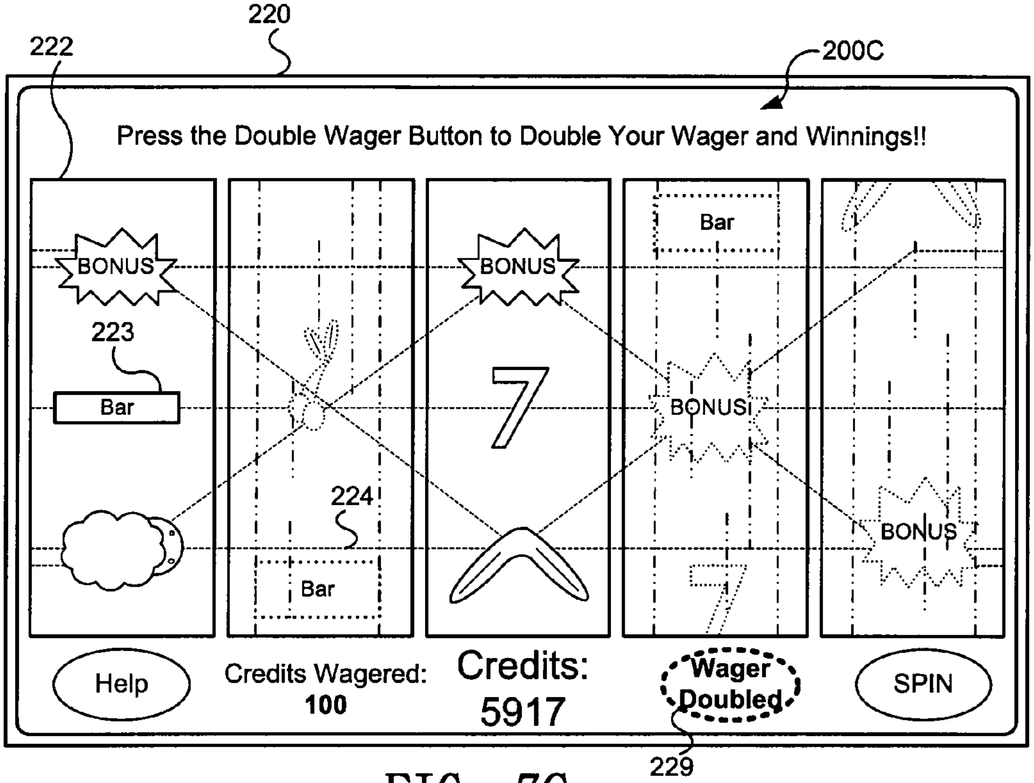

Referring to FIG. 7C, the player has chosen to double her wager by pressing the double wager button 229 on gaming device 200C. When the player touches the double wager button 229, the button becomes inactive. In addition the display 220 is updated to reflect that the number of credits wagered has doubled to 100 credits and that the credit meter is reduced by 50 credits to 5917 credits.

Figure 7D:
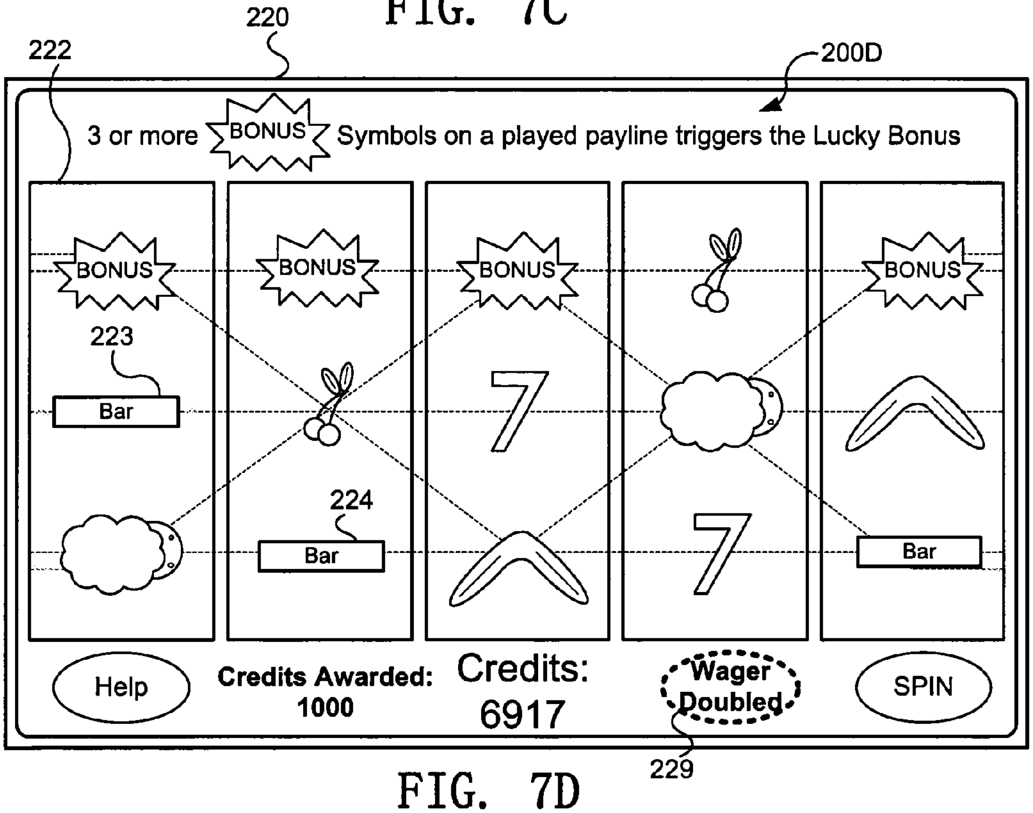

Referring to FIG. 7D, the remaining reels 222 of gaming device 200D have stopped and indicate that a three symbol bonus was awarded. The game display 220 indicates that the bonus was worth ten times the amount wagered, and that 1000 credits have been awarded to the player. The credit meter is also rolled up to show that 6917 credits are now available to wager or cash-out. Note that the although a winning outcome was indicated here by the first and second game information, the game may have been played with a preferred game sequence even if the second reel did not stop so as to complete the bonus pay. Rather, the simple fact that a three symbol bonus looked possible from the displayed first game information (stopped reels 1 and 3) may be enough to meet the predefined criteria.

Keno

Similarly to the slot machine embodiments, keno games often do not allow player interaction after the player's picks have been made and winning spots are revealed. Hence, as mentioned above, some embodiments of this concept cover keno embodiments even if there is no player interaction involved in the game itself. For example, multiple keno games may be analyzed and rapidly displayed with no further player interaction until the card is a winning on a spot draw. Keno games that involve player interaction include embodiments where a player picks a number of spots, a portion of the 20 spots are revealed, and the player has option of adding or moving some of their pick selections before the remainder of the winning spots are revealed. Of course the player may not be able to move or add a pick on a revealed winning spot (e.g., that spot is deactivated). Advance game analysis could determine whether the player has a chance of receiving a winning outcome based on their initial picks and first game information. Since the player may be limited on the number of moves she can make, this analysis could be kept relatively simple. In addition, a minimum wager requirement may be necessary to alter spots, or an additional side bet or wager may be required to be able to use this ability. FIGS. 8A-8D illustrate one embodiment of a keno game using player interaction and game information analysis to shape game play.

FIGS. 8A, 8B, 8C, and 8D are detail diagrams of a display of a video keno gaming device during a game according to embodiments of the invention.

Figure 8A:
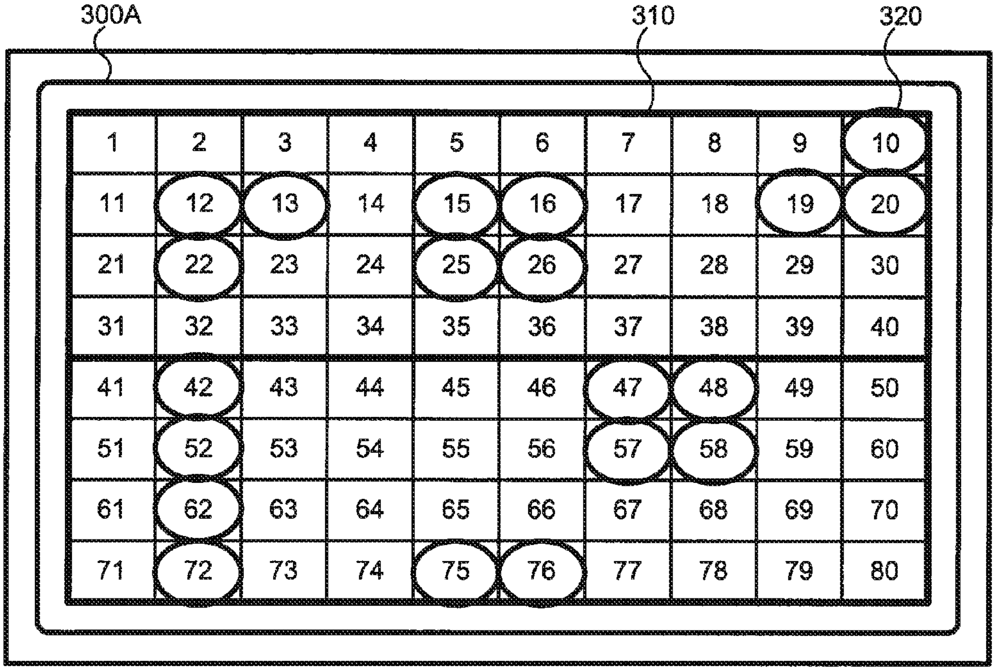
FIGS. 8A, 8B, 8C, and 8D are detail diagrams of a display of a video keno gaming device during a game according to embodiments of the invention.

Referring to FIG. 8A, a keno display 300A includes eighty number spots 310 divided into an upper half and lower half. A player may choose to pick a certain number of the spots, where each number of picks has an associated paytable. Typically a player cannot choose over 20 spots, although a player can select only one spot. The game then randomly chooses 20 winning spots and counts how many of the player's picks match the winning spots. For a Pick 20 Keno game, the player usually needs to select over 5 spots to win any award. In the illustrated embodiment, the player has chosen to pick 20 spots 320.

Figure 8B:
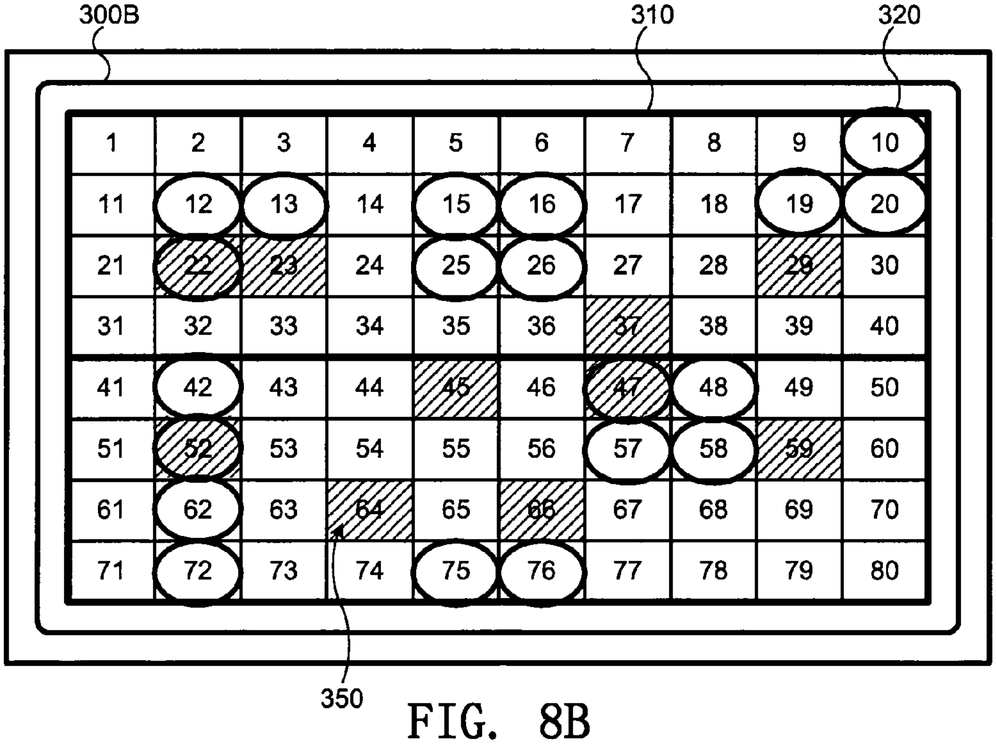
Figure 10:
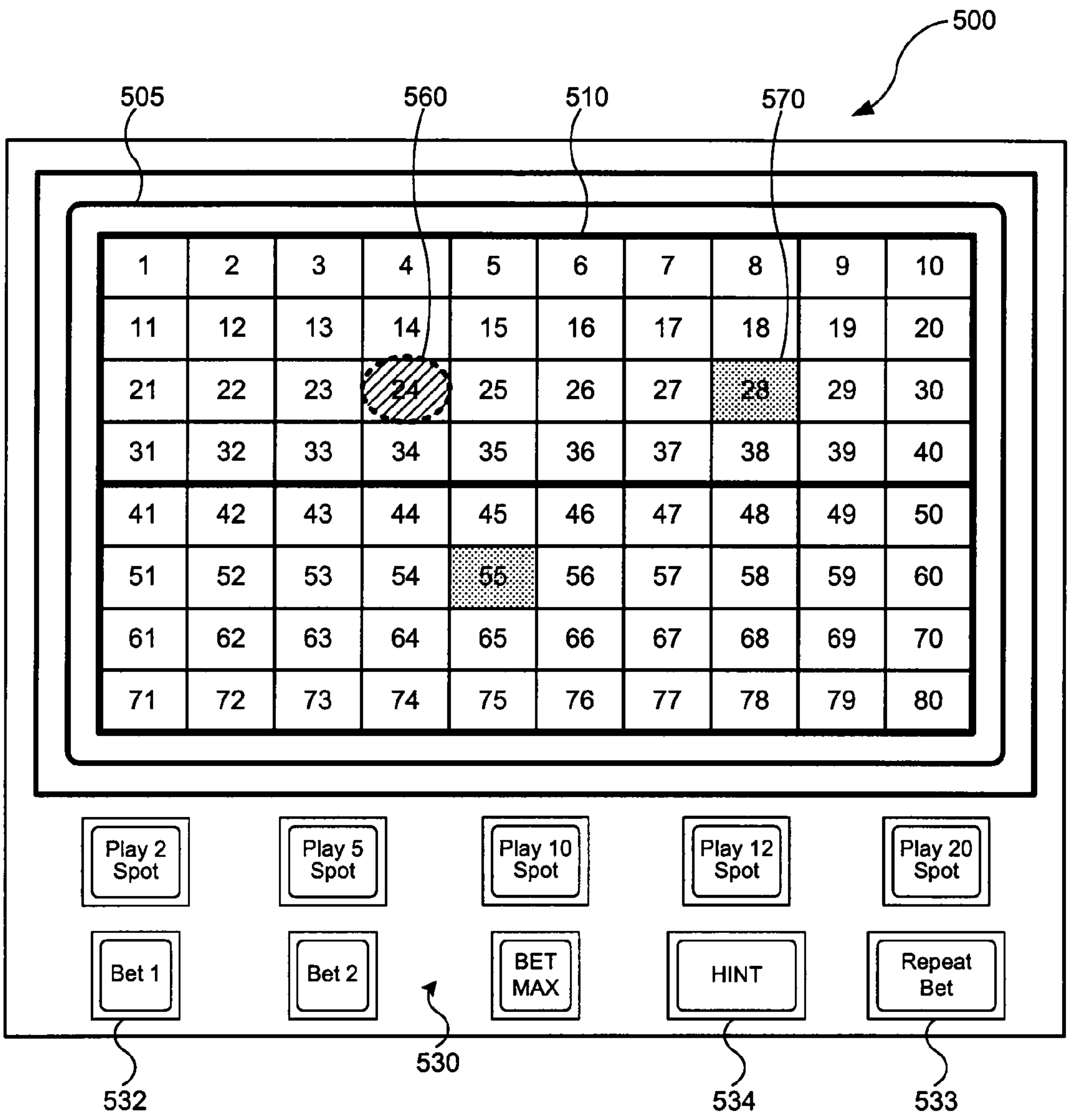
FIG. 10 is a detail diagram of a keno gaming device according to embodiments of the invention.

Referring to FIG. 8B, 10 of the 20 winning spots 350 are revealed on keno display 300B. Here, the player has already matched three of the winning spots with their picks. The player is now given the option to move some of their picks to different squares. The player is not allowed to move a pick to a spot already indicated as a winning spot. In this embodiment, the player is allowed to move 10 or less of her 20 picks.

Figure 8C:
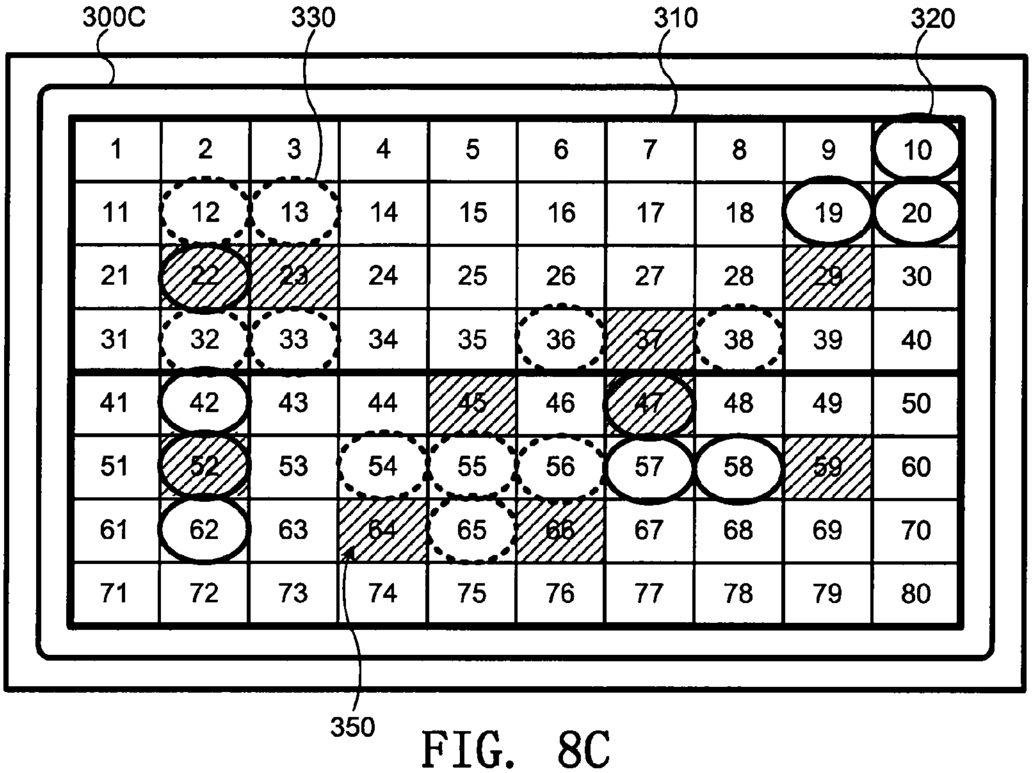

Referring to FIG. 8C, the player has chosen to move the fully allotted 10 picks to new spots. The dashed lines 330 represent new spots where the player has placed a moved pick. The player may choose to move picks based on perceived patterns they believe exist in the keno display 300C.

Figure 8D:
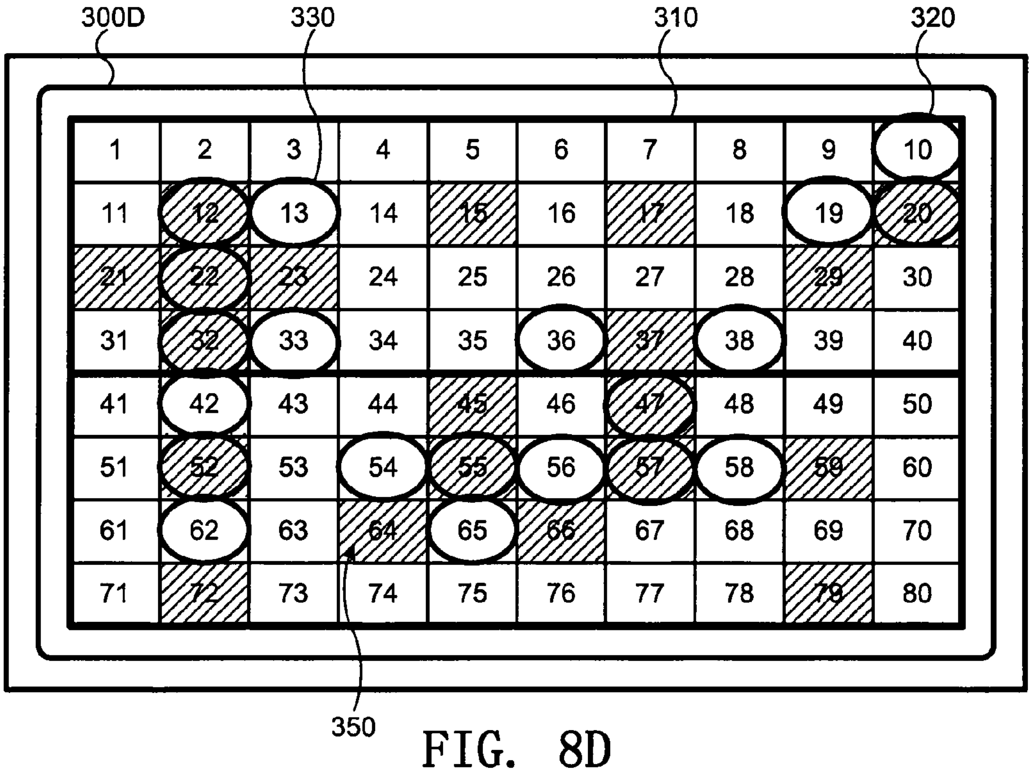

Referring to FIG. 8D, the other 10 winning spots are revealed on the keno display 300D. As shown in this figure, the player's new picks have worked out better than the original picks and the player has ended up matching 8 of the winning spots. The player is awarded ten times her bet for matching 8 out of the 20 winning spots.

Video Poker

Some of the video poker embodiments are covered in the copending application indicated in the related application section. However, in addition to these disclosed embodiments, video poker games may utilized the multiple game analysis concept of this invention, as well as portions of other disclosed embodiments in this application.

Blackjack, Pai Gow, Pachinko, and Other Games

These games are also covered by embodiments of this concept and can be used in a multiple game analysis format or in any format that utilizes player interaction. This analysis of game information for games with player interactions can be especially useful for Blackjack and Pai Gow, but may also be used in a variety of other games. For example, in a blackjack example, the gaming device may analyze cards from player's hand, cards from the dealer's hand, and possible hit cards for the player and dealer to determine whether the game should be played according to a preferred game sequence or a non-preferred game sequence.

Hints and Tips

Other embodiments may include the gaming device giving the player a "hint" or "tip" on how to act based on the analyzed game information. The player may have to be an indentified player to get a tip. The tips could be random, they could be accumulated by a player during game play, they could be a form of reward for player loyalty, or they could be purchased with additional credits when offered. In some embodiments, there could be dueling tips that may be based on different strategies (e.g., one tip could be a more volatile-style of play). The tips could include revealing slightly more game information, such as "don't hold the jack", removing a non-winning square from a keno board, or indicating which reel not to re-spin in a slot game where the player can re-spin one or more reels for an additional bet.

One of skill in the art of gaming device design will understand that these "tips" or extra game information may increase the odds of winning and hence will alter the theoretical payback percentage of the gaming device. To offset this increase, the paytable values may be changed or another aspect of the game may be altered. All techniques relating to the varied embodiments disclosed herein and all of the possible combinations thereof are within the scope of this inventive concept.

Figure 9:
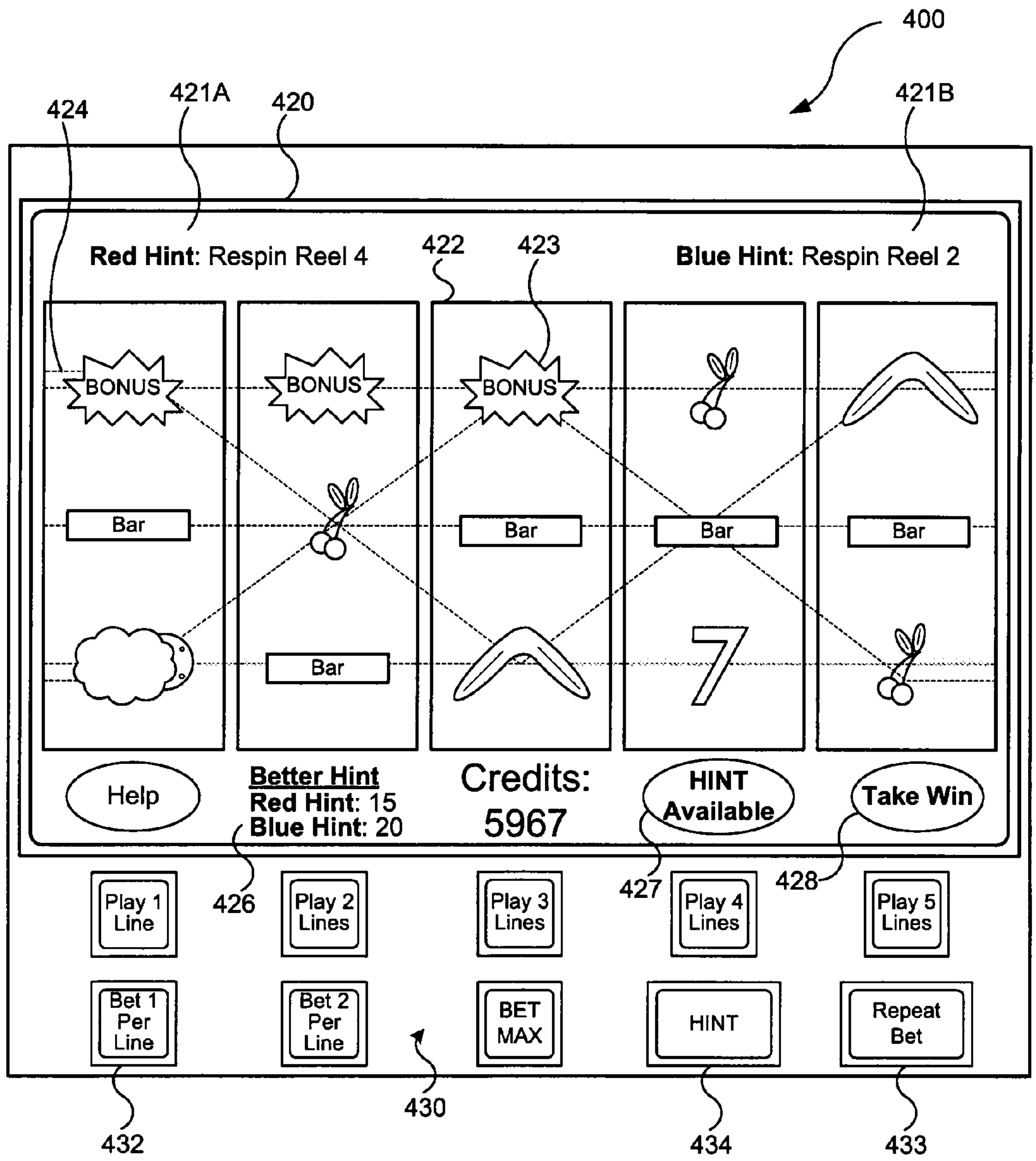
FIG. 9 is a detail diagram of a slot gaming device according to embodiments of the invention.

FIGS. 9 and 10 illustrate gaming device embodiments that utilize features of this hint concept. FIG. 9 is a detail diagram of a slot gaming device according to embodiments of the invention. FIG. 10 is a detail diagram of a keno gaming device according to embodiments of the invention.

Referring to FIG. 9, a gaming device 400 includes a display 420 and player interface panel 430. The display 420 includes a plurality of reels 422 each showing a plurality of symbols 423 that must align in a predefined combination along a played payline 424 to generate an award for the player. The player interface panel 430 includes one or more game buttons 432 and a game initiation button 433. These elements and features may operate in a similar way to the corresponding elements shown in FIG. 2B, and described above. In the embodiment shown in FIG. 9, the player interface panel 430 also includes a hint button 438. The player may activate the hint button to generate a hint based upon what is known about the second game information regarding the reel stop identity associated with each reel respint. In the example shown in FIG. 9, the player has activated the hint button 438, which has generated a "Red Hint" 421A and a "Blue Hint" 421B. Additionally, the game display 422 includes a hint scorecard 426 that shows which of the hints has turned out better in the past. The game display also includes a soft hint button 427 that corresponds to the physical hint button 434 on the player interface panel 430. The soft hint button also indicates that a hint is available for use. As mentioned above hints may be available when they are purchased with additional credits or otherwise earned.

Here, the Red Hint 421A indicates that the player should respin reel 4 in hopes of achieving another bonus symbol on the top payline 424 to complete a four symbol bonus pay. The Blue Hint 421B indicates that the player should respin reel 2 in hopes of completing a five symbol bar pay. The player also has the option of ignoring both hints and simply taking the three symbol bonus win already displayed by pressing the Take Win button 428. Here, since there is little risk in respinning reel 4, the player may opt to take the Red Hint and respin reel 4. The player may, however, choose to be slightly riskier and listen to the Blue Hint and respin reel 2. Note that with dueling tips, one tip may suggest a more volatile option. Additionally, while tips can point to suggested game play options, they do not necessarily have to be accurate or even helpful. In some embodiments, one of the tips may attempt to throw a player off. In this case, giving up a three symbol bonus pay in the hopes of getting a non-guaranteed five symbol bar pay is not advisable.

In embodiments where the hit is accurately based off of knowledge of the second game information, the player may receive a better winning outcome than if the player was simply guessing what to do. In the above example, for instance, the analysis of the second game information may reveal that either of the respin hint options will result in high paying winning combinations.

In some embodiments, the player may have to "buy" the use of the hint. That is, by activating the hint button 438 the player is spending some additional credits. The hint button may cost a predefined number of credits, or the use of the hint button may reduce any winnings by a certain number of credits or a percentage of the win. In one example, the use of the hint button may cost the equivalent of whatever the wager on the game is. Thus, if the player has wagered ten credits on the game, the use of the hint button will cost an additional ten credits. In a second example, the use of the hint button may reduce any win by two credits. Thus, if the player uses the hint button 438 and receives only a 2 credit win, the player does not win anything. Additionally, if the player receives a 10 credit outcome, the player will only win eight credits instead of 10. However, if the hint only indicates that no win is possible, the player does not have to pay any additional credits.

In alternate embodiments, the player may have to "earn" hints based on their game play or a casino promotion. The "hints" may be stored and used at a later time or date. For example, a player may earn the use of a hint after reaching a threshold of $500 of credits wagered (coin-in) or after a streak of ten losing hands. A casino may give away a ticket that can be inserted into a gaming device and used to activate a hint as a promotion for new players. The casino may also credit a player's account with a "hint" that can be downloaded and used after the player has identified herself to a gaming device that allows the use of hints. In other embodiments, however, when the player uses the hint button and no winning outcome is possible, the gaming device may allow the player to surrender the game and receive a portion of their wager back (e.g., half their wager is returned) without holding or drawing for additional cards.

Referring to FIG. 10, a keno gaming device 500 includes a display 505 with a plurality of numerical spots 510 and a player interface panel 530 that has a plurality of game buttons 532, a game initiation button 533, and a hint button 534. Here, the player may use the hint button 534 to generate one or more game play hints. For example, the player may receive a hint on spot not to pick, such as by deactivating a spot 570. Alternatively, a player may get a hint on spot that will be chosen as a winning spot 560. Many different hit variations are possible for keno that can take place prior to picking spots or during a player interaction game portion where a player can add or move picks when some of the winning spots are revealed.

Surrender

Some embodiments of this invention may allow a player to "surrender" a game when given the opportunity to interact with the game instead of making a decision on how to further game play. Once a player surrenders, the game is over and the player is not allowed to make any further choices regarding game play. The ability to surrender a game may be time limited after it is offered. By surrendering, a portion of the player's wager is returned (e.g., half of the player's wager) to the player and credited on the credit meter. In some embodiments, the surrender option is only available if the player activates a hint.

When a player surrenders, additional game information may be quickly revealed and displayed, such as draw cards, dealer's cards, respun reels, winning keno spots, etc. Alternatively, the part of the surrender may be forgoing the knowledge of what the additional game information was. In some embodiments, a surrender automatically triggers a new game and deducts a portion of the credits available on the credit meter. A player may choose to activate an automatic surrender during Fast Forward game play, where the game automatically surrenders hands for the player when it is not possible to have a winning game outcome.

Figure 11A:
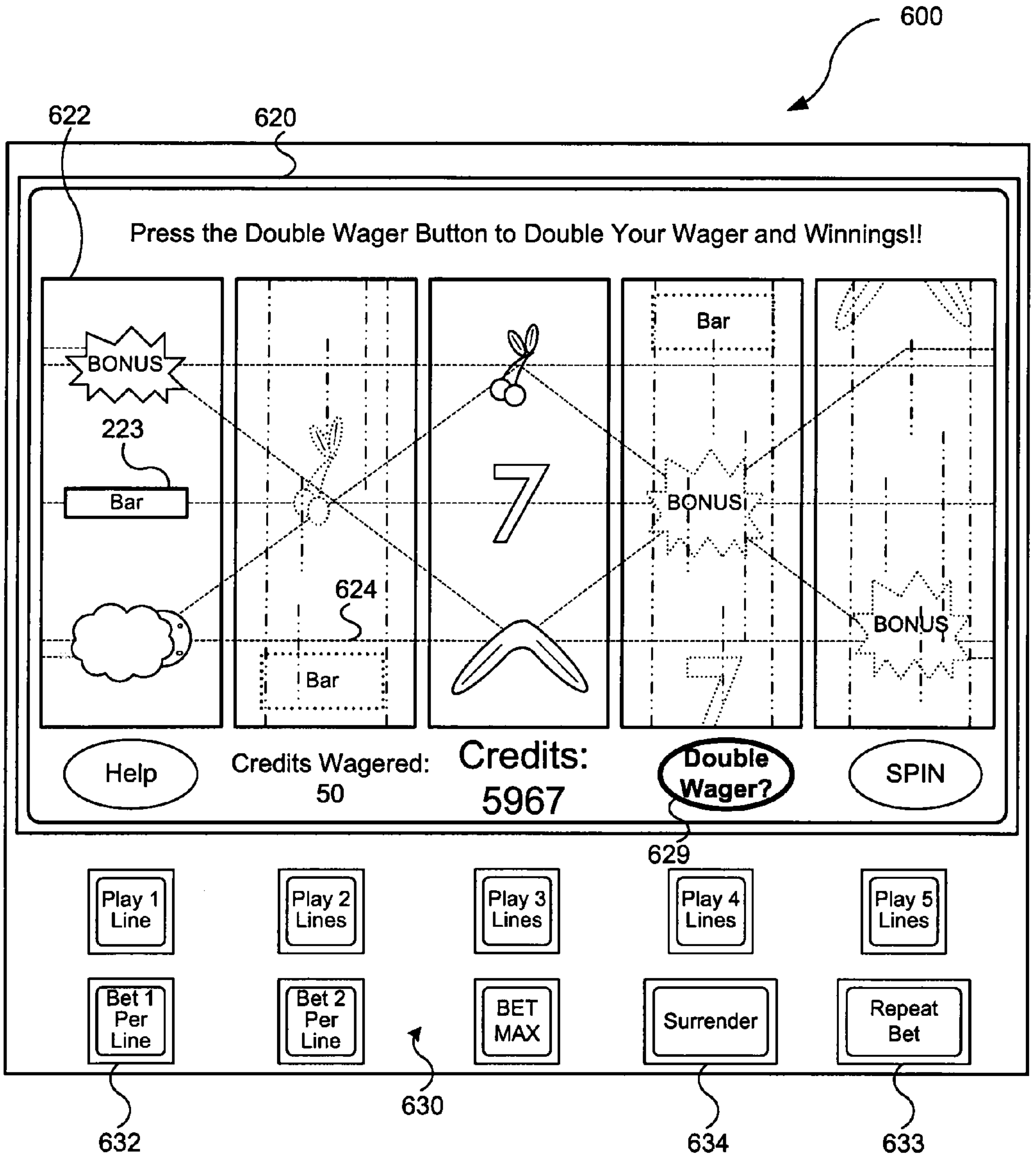
FIG. 11A is a detail diagram of a slot gaming device according to embodiments of the invention.
Figure 11B:
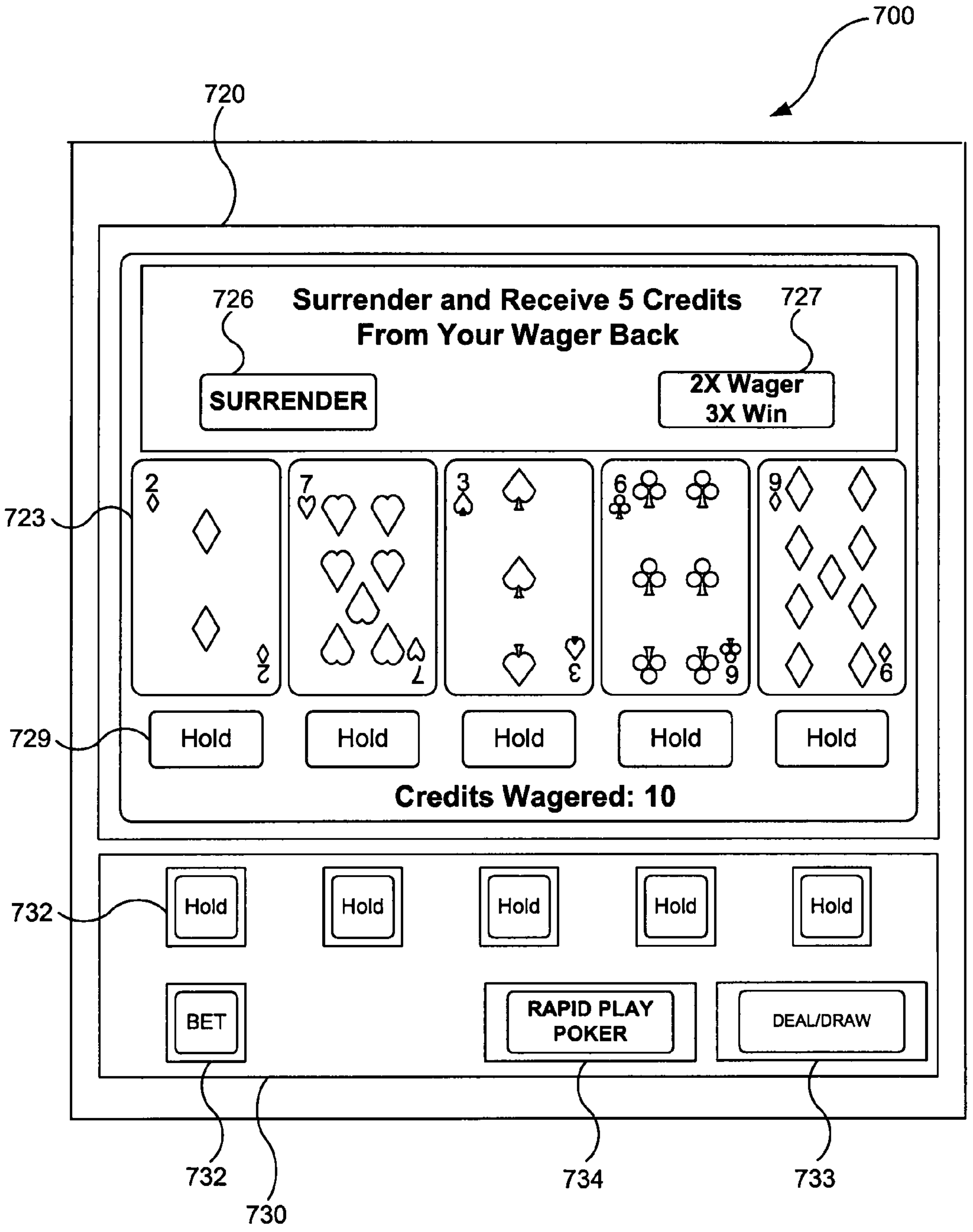
FIG. 11B is a detail diagram of a video poker gaming device according to embodiments of the invention.

FIG. 11A is a detail diagram of a slot gaming device according to embodiments of the invention. FIG. 11B is a detail diagram of a video poker gaming device according to embodiments of the invention.

Referring to FIG. 11A, a gaming device 600 includes a game display 620 having five reels 622 and a double wager button 629, and includes a player interface panel 630 having multiple game buttons 632, a game initiation button 633, and a surrender button 634. The player may use the surrender button 634 to surrender a game when prompted whether they would like to double their wager after having one or more reels stopped. In the illustrated embodiment, since the player has wagered 50 credits, the player would be able to surrender the game and receive 25 credits back. Here, the game 600 has stopped reels 622 one and three. Unfortunately, none of the symbols on the first stopped reel matches up to the symbols on the third stopped reel on the paylines 624. Hence, it doesn't matter what symbols land on reels two, four, and five. The game will result in a losing outcome. A player recognizing this scenario may chose to activate the surrender button 634 and receive 25 credits back. Once the player activates the surrender button 634, the game device may or may not display stopped reels two, four, and five depending on the embodiment.

Referring to FIG. 11B, a video poker gaming device 700 includes a display 720 showing a dealt hand of five cards 723 and multiple soft buttons 729 associated with the displayed cards 723. The video poker gaming device 700 also includes a player interface panel 730 that includes multiple game buttons 732, a Deal/Draw button 733, and a Rapid Play Poker Button 734. In the illustrated embodiment, the player has been dealt a hand that does not have a high percent chance of resulting in a winning poker hand. Hence, the game display 720 has provided the player with an option to press a surrender button 726 to surrender the hand and receive 5 credits of the 10 credit wager back. However, the player has also been given the chance to double her wager and receive three times her initial wager back if she receives a winning hand on the draw by pressing the 2× Wager/3× Win button 727. Here, the game analysis has determined that the player has a poor initial hand and has given the player a chance to be more or less volatile be going for a larger win with an addition wager risk or simply taking half of the initial wager back.

It is important to note that while embodiments of this concept have been discussed with an emphasis on an analysis looking for something positive in the game information to determine if a hand should be played with a preferred play sequence, the opposite analysis may correspond to the preferred play sequence. That is, if the game information looks dire for the first game information, a preferred game sequence may make an offer of a better award for continued play or for a minor additional wager, while favorable game information may result in a non-preferred game sequence that simply provides the player with the award without any additional option to surrender or go for a big win.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method of operating a gaming device of the type that displays a combination of symbols as an outcome for play of a game on the gaming device, the method including:

initiating a game on the gaming device, including receiving at least one player selection of a spot from a plurality of selectable spots displayed on a game board;

determining an outcome for the game;

displaying only a portion of the symbols in the determined outcome, including displaying only a portion of winning spots;

permitting the player to interact with the gaming device after the portion of symbols is displayed, including permitting the player to change at least one player selected spot to a spot that is not displayed as a winning spot; and displaying the remainder of the symbols in the determined outcome.

2. A method of operating a gaming device of the type that displays a combination of symbols as an outcome for play of a video poker game on the gaming device, the method including:

initiating a game on the gaming device;

determining at least a portion of an outcome for the game;

determining whether a portion of the symbols, including cards initially dealt in the game, in the determined outcome meets a predefined criterion including whether the dealt cards and the cards possibly drawn by the player allow for the possibility of a winning outcome;

initiating a first game sequence when the portion of symbols meets the predefined criterion including:

displaying the portion of symbols;

permitting the player to interact with the gaming device after the portion of symbols is displayed, including permitting the player to draw at least one card to replace at least one card initially dealt in the game; and displaying the remainder of the symbols in the determined outcome; and initiating a second game sequence when the portion of the symbols does not meet the predefined criterion, including displaying the cards initially dealt in the game and the cards possibly drawn by the player without permitting player interaction with the gaming device.

3. A gaming device of the type that displays a combination of symbols as an outcome for play of a game including video poker on the gaming device including:

a gaming display to display a game played on the gaming device by a player;

a game processor configured to determine at least a portion of an outcome for the game;

an analyzer configured to determine whether a portion of the symbols, including cards initially dealt in the game, in the outcome meets a predefined criterion including whether the portion of the symbols allow for the possibility of a winning game;

wherein the processor is further configured to initiate a first game sequence including displaying the portion of symbols, requesting player interaction including permitting the player to draw at least one card initially dealt in the game, and displaying the remainder of the symbols in the determined outcome when the portion of symbols meets the predetermined outcome including whether the dealt cards and the cards possibly drawn by the player allow for the possibility of a winning game; and wherein the game processor is further configured to initiate a second game sequence when the portion of symbols does not meet the predefined criterion, including displaying the cards initially dealt in the game and the cards possibly drawn by the player without permitting player interaction with the gaming device.

4. The gaming device of claim 3 further including a player interface panel having a rapid play game initiating button configured to initiate a rapid play gaming session.

5. The gaming device of claim 3 wherein the analyzer is further configured to reveal a game tip to the player based on data generated by the game processor.

6. A method of operating a gaming device of the type that displays a combination of symbols as an outcome for play of a game on the gaming device, the method including:

initiating a game on the gaming device, including receiving at least one player selection of a spot from a plurality of selectable spots displayed on a game board;

determining an outcome for the game;

displaying only a portion of the symbols in the determined outcome, including displaying only a portion of winning spots;

permitting the player to interact with the gaming device after the portion of symbols is displayed, including permitting the player to select at least one more spot that is not displayed as a winning spot; and displaying the remainder of the symbols in the determined outcome.

7. The method of claim 6 wherein displaying the remainder of the symbols in the determined outcome includes displaying the remainder of the winning spots.

8. A method of operating a gaming device of the type that displays a combination of symbols as an outcome for play of a game on the gaming device, the gaming device including a slot game having a plurality of reels , the method including:

accepting a wager from a player;

initiating a game on the gaming device;

determining at least a portion of an outcome for the game;

determining whether a portion of the symbols in the determined outcome meets a predefined criterion, including whether the portion of symbols allow for the possibility of a winning outcome;

initiating a first game sequence when the portion of symbols meets the predefined criterion including:

displaying the portion of symbols, including stopping fewer than all the reels and displaying the symbol outcomes on the stopped reels;

permitting the player to interact with the gaming device after the portion of symbols is displayed, including permitting the player to modify the wager prior to displaying the remainder of the symbols in the determined outcome; and displaying the remainder of the symbols in the determined outcome, including displaying symbol outcomes for the remainder of the reels; and initiating a second game sequence when the portion of the symbols does not meet the predefined criterion, including displaying the symbol outcomes for the reels.

9. A gaming device of the type that displays a combination of symbols as an outcome for play of a game on the gaming device, the gaming device including a slot game having a plurality of reels, including:

a gaming display to display a game played on the gaming device by a player;

a game processor configured to determine at least a portion of an outcome for the game;

an analyzer configured to determine whether a portion of the symbols in the outcome meets a predefined criterion, including whether the portion of symbols allow for the possibility of a winning game;

wherein the processor is further configured to accept a wager from a player; to initiate a first game sequence including displaying the portion of symbols, including stopping fewer than all of the reels and displaying symbol outcomes for the stopped reels; to request player interaction, including permitting the player to modify the wager prior to displaying the remainder of the symbols in the determined outcome; and to display the remainder of the symbols in the determined outcome when the portion of symbols meets the predetermined outcome, including displaying symbol outcomes for the remainder of the reels; and wherein the game processor is further configured to initiate a second game sequence when the portion of symbols does not meet the predefined criterion, including displaying the symbol outcomes for the reels.

10. The gaming device of claim 9 further including a player interface panel having a rapid play game initiating button configured to initiate a rapid play gaming session.

11. The gaming device of claim 9 wherein the analyzer is further configured to reveal a game tip to the player based on data generated by the game processor.

* * * * *